(12) United States Patent
Soni et al.

(10) Patent No.: US 12,319,424 B1
(45) Date of Patent: Jun. 3, 2025

(54) BALANCING AND MEASURING CIRCUIT FOR HIGH VOLTAGE SYSTEMS

(71) Applicant: Archer Aviation Inc., San Jose, CA (US)

(72) Inventors: Harshit Soni, Milpitas, CA (US); Stephen Michael Spiteri, Livermore, CA (US)

(73) Assignee: Archer Aviation Inc., San Jose, CA (US)

( * ) Notice: Subject to any disclaimer, the term of this patent is extended or adjusted under 35 U.S.C. 154(b) by 0 days.

(21) Appl. No.: 18/883,733

(22) Filed: Sep. 12, 2024

(51) Int. Cl.
*B64D 31/16* (2024.01)
*H02J 1/08* (2006.01)

(52) U.S. Cl.
CPC ............ *B64D 31/16* (2024.01); *H02J 1/082* (2020.01); *H02J 1/084* (2020.01)

(58) Field of Classification Search
CPC ............ B04D 31/16; H02J 1/082; H02J 1/084
USPC .......................................................... 307/9.1
See application file for complete search history.

(56) References Cited

U.S. PATENT DOCUMENTS

| | | |
|---|---|---|
| 8,344,865 B2 | 1/2013 | Wang |
| 9,696,384 B2 | 7/2017 | Wang et al. |
| 10,852,334 B1 | 12/2020 | Liu et al. |

OTHER PUBLICATIONS

B.T. Prashant Singh et al. (2019). Extensive review on Supercapacitor cell voltage balancing. E3S Web of Conferences, 87, 01010. https://doi.org/10.1051/e3sconf/20198701010.

*Primary Examiner* — Hal Kaplan
(74) *Attorney, Agent, or Firm* — Finnegan, Henderson, Farabow, Garrett & Dunner, LLP

(57) ABSTRACT

The present disclosure relates generally to high voltage systems. In one embodiment, a balancing and measuring circuit is disclosed, comprising: a first capacitor electrically coupled between a first voltage and a chassis voltage, wherein the first voltage is greater than the chassis voltage; a second capacitor electrically coupled between a second voltage and the chassis voltage, wherein the second voltage is less than the chassis voltage; a first circuit associated with the first capacitor; and a second circuit associated with the second capacitor, wherein the first circuit and the second circuit each comprise: a resistive element; a switching element; a voltage circuit configured to generate a reference voltage; and a controller configured to monitor a voltage of a reference capacitor and to control the switching element based on the monitored voltage, wherein the resistive element and the switching element are connected in series.

30 Claims, 13 Drawing Sheets

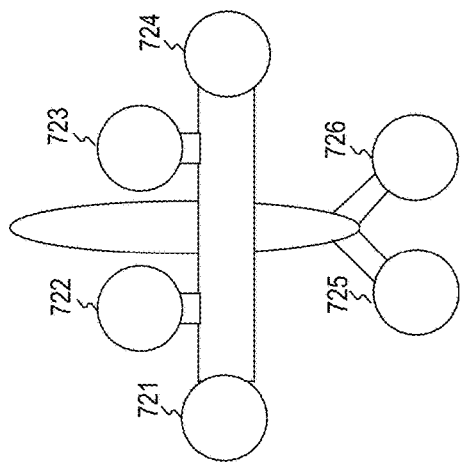
FIG. 7C
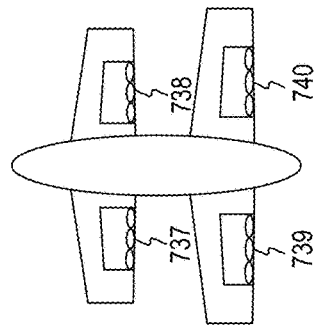
FIG. 7F
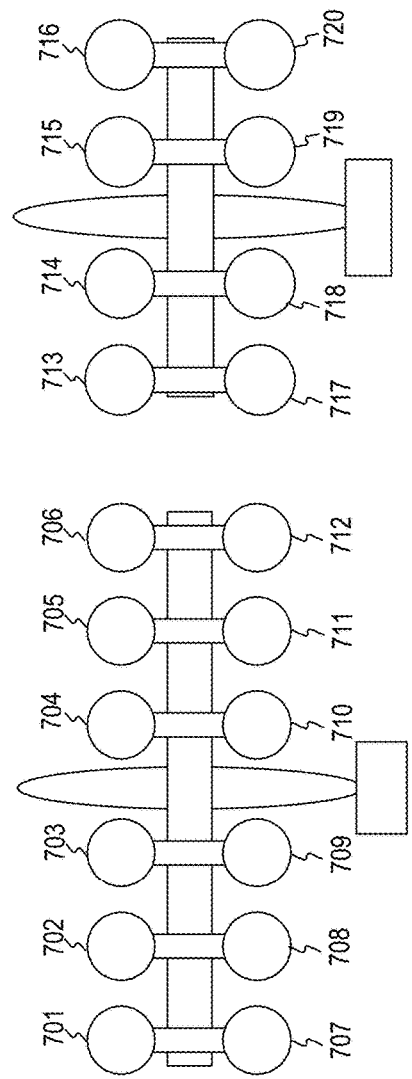
FIG. 7B
FIG. 7A
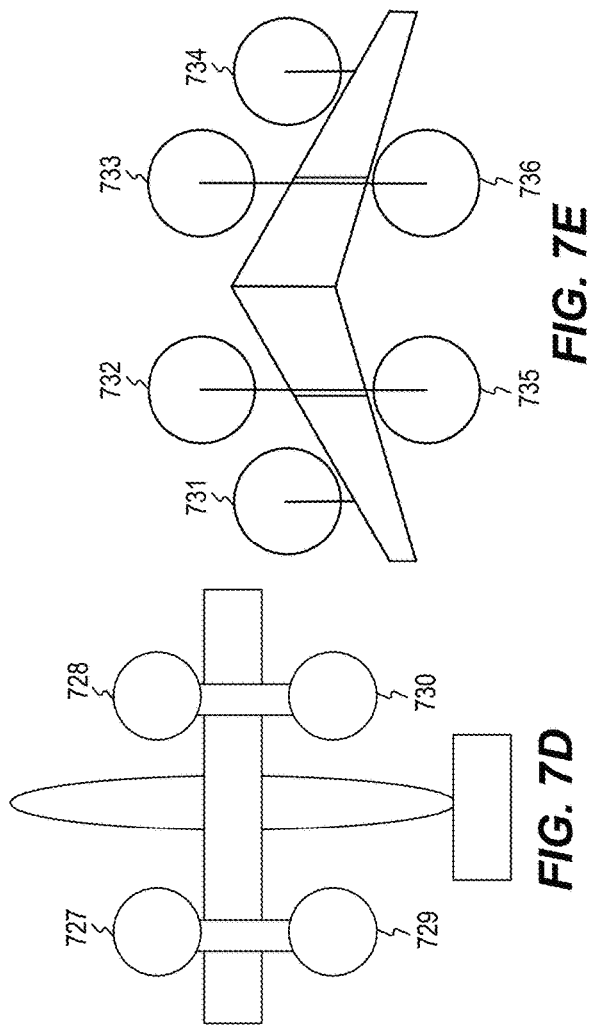
FIG. 7E
FIG. 7D

BALANCING AND MEASURING CIRCUIT FOR HIGH VOLTAGE SYSTEMS

TECHNICAL FIELD

This disclosure relates generally to high voltage systems, including innovations in aircrafts driven by electric propulsion systems. Certain aspects of the present disclosure generally relate to systems and methods for balancing and measuring circuits in high voltage systems, such as those in aircrafts driven by electric propulsion systems and in other types of vehicles, as well as aircrafts in flight simulators and video games. Other aspects of the present disclosure generally relate to improvements in balancing and measuring circuits, which provide particular advantages in aerial vehicles and may be used in other types of vehicles.

BACKGROUND

The inventors here have recognized several problems that may be associated with high voltage systems. For example, in a high voltage system, many components in the system may have to be designed (e.g., rated) for expected use while experiencing a certain voltage (e.g., maximum voltage supplied by the power source). This requirement for particular components may increase the difficulty of assembling and/or repairing the high voltage system.

This problem may be particularly significant in vehicles powered (partially or totally) by one or more electric engines, including cars and aircrafts with multiple electric engines (e.g., a multi-rotor aircraft), a common configuration in many electric aircraft. It may be desirable to provide a system that allows for a high voltage system to utilize components designed (e.g., rated) for a lower voltage without changing the operating voltage of the system.

SUMMARY

The present disclosure relates generally to high voltage systems of electric vehicles. More particularly, and without limitation, the present disclosure relates to innovations in high voltage systems of electric aircraft, including tilt-rotor aircraft that use electrical propulsion systems. Certain aspects of the present disclosure relate to balancing and measuring circuits of high voltage systems. Other aspects of the present disclosure relate to balancing voltages across and measuring impedances of Class Y capacitors in high voltage circuits and systems. For example, some embodiments relate to balancing capacitor voltage levels, which can reduce an isolation barrier voltage, allowing for the use of lower voltage-rated components, which would otherwise be unsafe or unworkable for the system without the reduced isolation barrier voltage. Balancing capacitor voltage levels can also be performed to balance or compensate for a leakage amount, to maintain equal or near-equal amounts of voltage at desired portions of circuitry. Other disclosed techniques relate to measuring isolation voltage without causing large voltage swings on Class Y capacitors, which can be unsafe and degrade components more quickly.

One aspect of the present disclosure comprises a balancing and measuring circuit for a high voltage system, comprising: a first capacitor electrically coupled between a first voltage and a chassis voltage, wherein the first voltage is greater than the chassis voltage; a second capacitor electrically coupled between a second voltage and the chassis voltage, wherein the second voltage is less than the chassis voltage; a first circuit associated with the first capacitor; and a second circuit associated with the second capacitor, wherein the first circuit and the second circuit each comprise: a resistive element; a switching element; a voltage circuit configured to generate a reference voltage; and a controller configured to monitor a voltage of a reference capacitor and to control the switching element based on the monitored voltage, wherein the resistive element and the switching element are connected in series.

Another aspect of the present disclosure comprises a method for balancing and measuring a voltage in a circuit, comprising: receiving a reference voltage; controlling a switching element until a voltage of a capacitor is equal to the received reference voltage; determining a first impedance of the capacitor; modifying the received reference voltage by a predetermined value; controlling the switching element until the voltage of the capacitor is equal to the modified reference voltage; determining a second impedance of the capacitor; determining a result based on the first impedance and the second impedance; and outputting the result.

Yet another aspect of the present disclosure comprises an aircraft comprising: a high voltage system; one or more flight control computers; and a balancing and measuring circuit, comprising: a first capacitor electrically connected between a first voltage and a chassis voltage, wherein the first voltage is greater than the chassis voltage; a second capacitor electrically connected between a second voltage and the chassis voltage, wherein the second voltage is less than the chassis voltage; a first circuit associated with the first capacitor; and a second circuit associated with the second capacitor, wherein the first circuit and the second circuit each comprise: a resistive element; a switching element; a voltage circuit configured to generate a reference voltage; and a controller configured to monitor a voltage of a reference capacitor and to control the switching element based on the monitored voltage, wherein the resistive element and the switching element are connected in series.

Yet another aspect of the present disclosure comprises a non-transitory computer-readable medium storing instructions that, when executed by at least one processor, cause the at least one processor to perform operations comprising: controlling a switching element until a voltage of a capacitor is equal to a received reference voltage; determining a first impedance of the capacitor; modifying the received reference voltage by a predetermined value; controlling the switching element until the voltage of a capacitor is equal to the modified reference voltage; determining a second impedance of the capacitor; determining a result based on the first impedance and the second impedance; and outputting the result.

BRIEF DESCRIPTION OF THE DRAWINGS

FIGS. 7A-7F illustrate exemplary top plan views of VTOL aircraft, consistent with disclosed embodiments.

DETAILED DESCRIPTION

Figure 1:
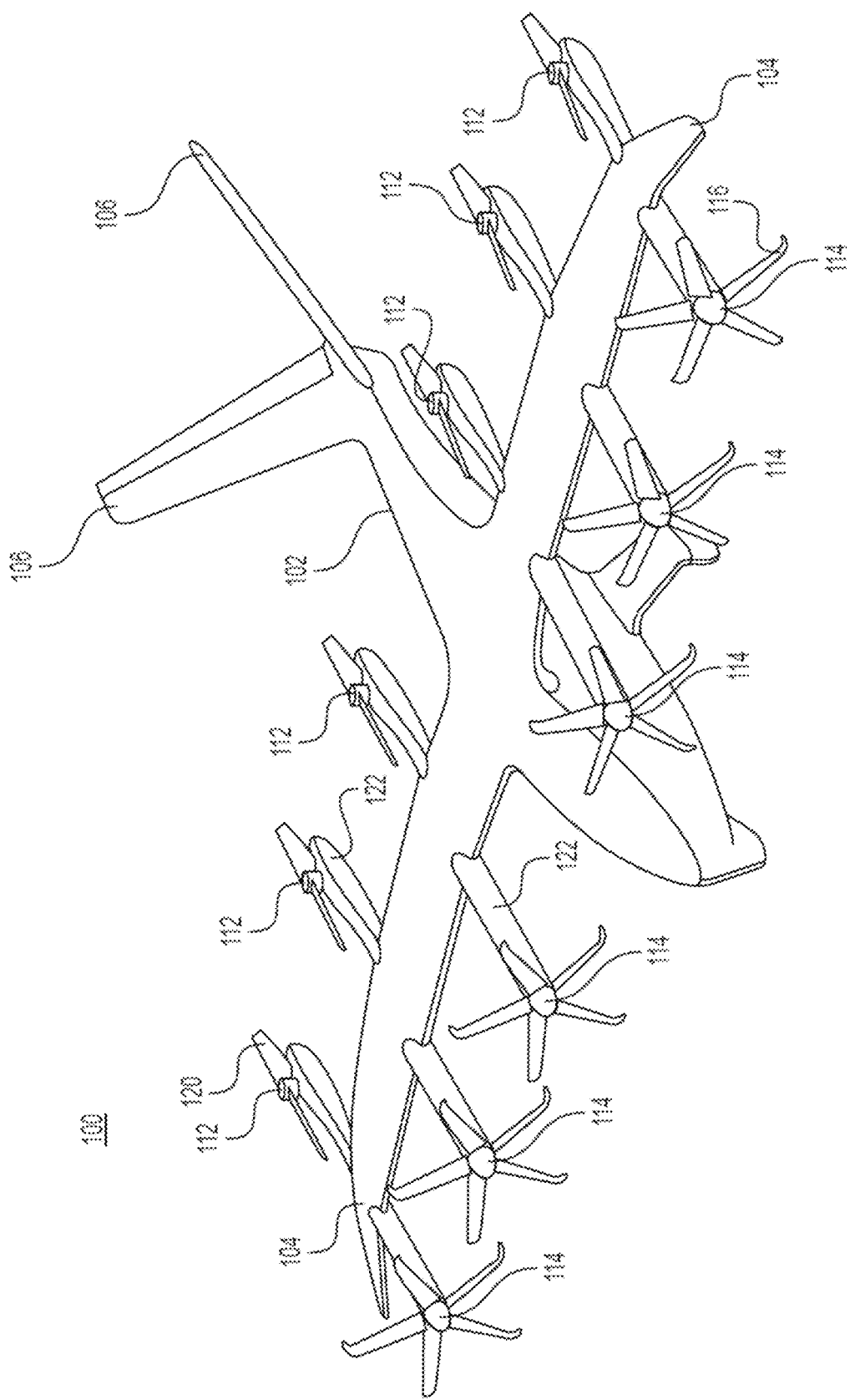
FIG. 1 shows an exemplary vertical takeoff and landing (VTOL) aircraft, consistent with disclosed embodiments.

The present disclosure addresses systems, components, and techniques primarily for use in a high voltage system. For example, the high voltage system may be implemented in an aircraft with a pilot (e.g., an aircraft without a pilot (e.g., a UAV), a drone, a helicopter, an airplane, a car, a sea glider, a motorcycle, a train, a bus, and/or a ship. Additionally or alternatively, the high voltage system may be implemented in a non-vehicular setting, such as in an industrial manufacturing machine, an appliance, a turbine, etc. An aircraft includes a physical body and one or more components (e.g., a wing, a tail, a propeller) configured to allow the aircraft to fly. The aircraft may include any configuration that includes at least one propeller. In some embodiments, the aircraft is driven (e.g., provided with thrust) by one or more electric propulsion systems (hereinafter referred to as electric propulsion units or "EPUs"), which may include at least one engine, at least one rotor, at least one propeller, or any combination thereof. The aircraft may be fully electric, hybrid, or gas powered. For example, in some embodiments, the aircraft is a tilt-rotor aircraft configured for frequent (e.g., over 50 flights per work day), short-duration flights (e.g., less than 100 miles per flight) over, into, and out of densely populated regions. The aircraft may be configured to carry 4-6 passengers or commuters who have an expectation of a comfortable experience with low noise and low vibration. Accordingly, it is desirable to include active protection systems and circuits to improve the high voltage circuitry of electric systems and allow for flexibility for a greater range of components, including lower voltage-rated components.

Disclosed embodiments provide new and improved configurations of aircraft components (e.g., high voltage systems), some of which are not observed in conventional aircraft, and/or identified design criteria for components that differ from those of conventional aircraft. Such alternate configurations and design criteria, in combination addressing drawbacks and challenges with conventional components, yielded the embodiments disclosed herein for various configurations and designs of components for an aircraft (e.g., electric aircraft or hybrid-electric aircraft) driven by a propulsion system.

In some embodiments, the aircraft driven by a propulsion system of the present disclosure may be designed to be capable of both vertical and conventional takeoff and landing, with a distributed propulsion system enabling vertical flight, horizontal and lateral flight, and transition (e.g., transitioning between vertical flight and horizontal flight). The aircraft may generate thrust by supplying high voltage electrical power to a plurality of engines of the distributed propulsion system, which may include components to convert the high voltage electrical power into mechanical shaft power to rotate a propeller.

Embodiments may include an electric engine (e.g., motor) connected to an onboard electrical power source, which may include a device capable of storing energy such as a battery or capacitor, and may optionally include one or more systems for harnessing or generating electricity such as a fuel powered generator or solar panel array. In some embodiments, the aircraft may comprise a hybrid aircraft configured to use at least one of an electric-based energy source or a fuel-based energy source to power the distributed propulsion system. In some embodiments, the aircraft may be powered by one or more batteries, internal combustion engines (ICE), generators, turbine engines, or ducted fans.

The engines may be mounted directly to the wing, or mounted to one or more booms attached to the wing. The amount of thrust each engine generates may be governed by a torque command from a Flight Control System (FCS) over a digital communication interface to each engine. Embodiments may include forward engines (and associated propellers) that are capable of altering their orientation, or tilt.

The engines may rotate the propellers in a clockwise or counterclockwise direction. In some embodiments, the difference in propeller rotation direction may be achieved using the direction of engine rotation. In other embodiments, the engines may all rotate in the same direction, and gearing may be used to achieve different propeller rotation directions.

In some embodiments, an aircraft may possess quantities of engines in various combinations of forward and aft engine configurations. A forward engine may be considered an engine that is positioned predominantly towards the leading edge of a wing. An aft engine may be considered an engine that is positioned predominantly towards the trailing edge of a wing. For example, an aircraft may possess six forward and six aft engines, five forward and five aft engines, four forward and four aft engines, three forward and three aft engines, two forward and two aft engines, or any other combination of forward and aft engines, including embodiments where the number of forward engines and aft engines are not equivalent.

In some embodiments, for a vertical takeoff and landing (VTOL) mission, the forward and aft engines may provide vertical thrust during takeoff and landing. During flight phases where the aircraft is moving forward, the forward engines may provide horizontal thrust, while the propellers of the aft engines may be stowed at a fixed position in order to minimize drag. The aft engines may be actively stowed with position monitoring.

Transition from vertical flight to horizontal flight and vice-versa may be accomplished via the tilt propeller subsystem. The tilt propeller subsystem may redirect thrust between a primarily vertical direction during vertical flight phase (e.g., hover-phase) to a horizontal or near-horizontal direction during a forward-flight cruising phase, based on a tilt of one or more propellers (e.g., determining directionality of one or more propellers). A variable pitch mechanism may change the forward engine's propeller-hub assembly blade collective angles for operation during phases of flight, such as a hover-phase, transition phase, and cruise-phase. Vertical lift may be thrust in a primarily vertical direction (e.g., during a hover-phase). Horizontal thrust may be thrust in a primarily horizontal direction (e.g., during a cruise-phase).

In some embodiments, a "phase of flight," or "flight mode," (e.g., hover, cruise, forward flight, takeoff, landing, transition) may be defined by a combination flight conditions (e.g., a combination of flight conditions within particular ranges), which may include one or more of an airspeed, altitude, pitch angle (e.g., of the aircraft), tilt angle (e.g., of one or more propellers), roll angle, rotation speed (e.g., of a propeller), torque value, pilot command, or any other value indicating a current or requested (e.g., commanded) state of at least part of the aircraft.

In some embodiments, in a conventional takeoff and landing (CTOL) mission, the forward engines may provide horizontal thrust for wing-borne take-off, cruise, and landing, and the wings may provide vertical lift. In some embodiments, the aft engines may not be used for generating thrust during a CTOL mission and the aft propellers may be stowed in place. In other embodiments, the aft engines may be used at reduced power to shorten the length of the CTOL takeoff or landing.

As detailed herein, embodiments of the aircraft may include a high voltage power system and high voltage power equipment, components, and/or devices (e.g., motor, high voltage to low voltage DC-DC converter). High voltage systems and associated circuitry require components designed (e.g., rated) for use in high voltage systems. Safe and continued expected operation of such components is critical to safe and continued expected operation of the entire system (e.g., vehicle). Furthermore, such components designed for one high voltage system operating at a first voltage (e.g., 800 V) may be costlier, larger (e.g., in mass, in volume), and/or more specialized (e.g., harder to acquire) compared to similar components designed for another high voltage system at a lower voltage (e.g., 400 V). Therefore, implementing the exemplary balancing and measuring circuit of the present disclosure to lower the effectively experienced voltage from a first voltage to a lower voltage may decrease the size (e.g., in mass, in volume), increase the efficiency, decrease the difficulty to assemble or repair (e.g., in acquiring components), and/or decrease the cost to assemble or repair (e.g., cost of components). This may also decrease the weight of components on, for example, an aircraft, which may increase its flight range.

As further detailed below with reference to FIGS. 8A-11, a balancing and measuring circuit may improve a high voltage system. By actively balancing voltages across components (e.g., capacitors) and measuring leakage impedances, lower voltage rated components may be safely implemented and utilized. Further, the lifespan of such components may be extended by actively managing their experienced loads. As a result, the efficiency of the system may be increased.

The disclosed embodiments actively measure and balance one or more characteristics (e.g., voltage, current, impedance) of components in high voltage systems. In some embodiments, balancing one or more characteristics of a component may include controlling one or more switching elements to control the amount of current flowing through the component. For example, by balancing voltages across capacitors (e.g., Class Y capacitors in an EMI filter) in a high voltage system, the isolation barrier voltage rating is reduced (e.g., halved) for creepage distance requirements (e.g., can shrink the size of the circuit) and the reliability and/or lifespan of the capacitors are increased. In some embodiments, measuring one or more characteristics of a component may include varying the amount of current flowing through the component, measuring a response, and determining the one or more characteristics. For example, by measuring (e.g., monitoring) the leakage impedance associated with a high voltage system (e.g., in an electromagnetic interference, or "EMI," filter), potential faults or failures can be detected quickly and improve the safety of the system.

In some embodiments, an aircraft of any of the disclosed embodiments may be simulated. For example, the aircraft may be simulated in a simulation environment, such as in a simulator (e.g., a simulator for flight training), a testing simulation environment, or a virtual environment in a video game. Additionally or alternatively, in some embodiments, at least one device of an aircraft may be simulated. For example, the at least one device (e.g., EPU, display wing, effector, and/or actuator, etc.) may be simulated in a simulation environment, such as in a simulator (e.g., a simulator for flight training), a simulated testing environment, or a virtual environment in a video game. A representation of the simulated display may be displayed on at least one display device (e.g., monitor, tablet, smartphone, computer screen, or any other display device) operatively connected to at least one processor configured to execute software code stored in a storage medium for performing balancing and measuring operations, such as those further detailed below with reference to FIGS. 8A-11.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the subject matter recited in the appended claims.

Figure 2:
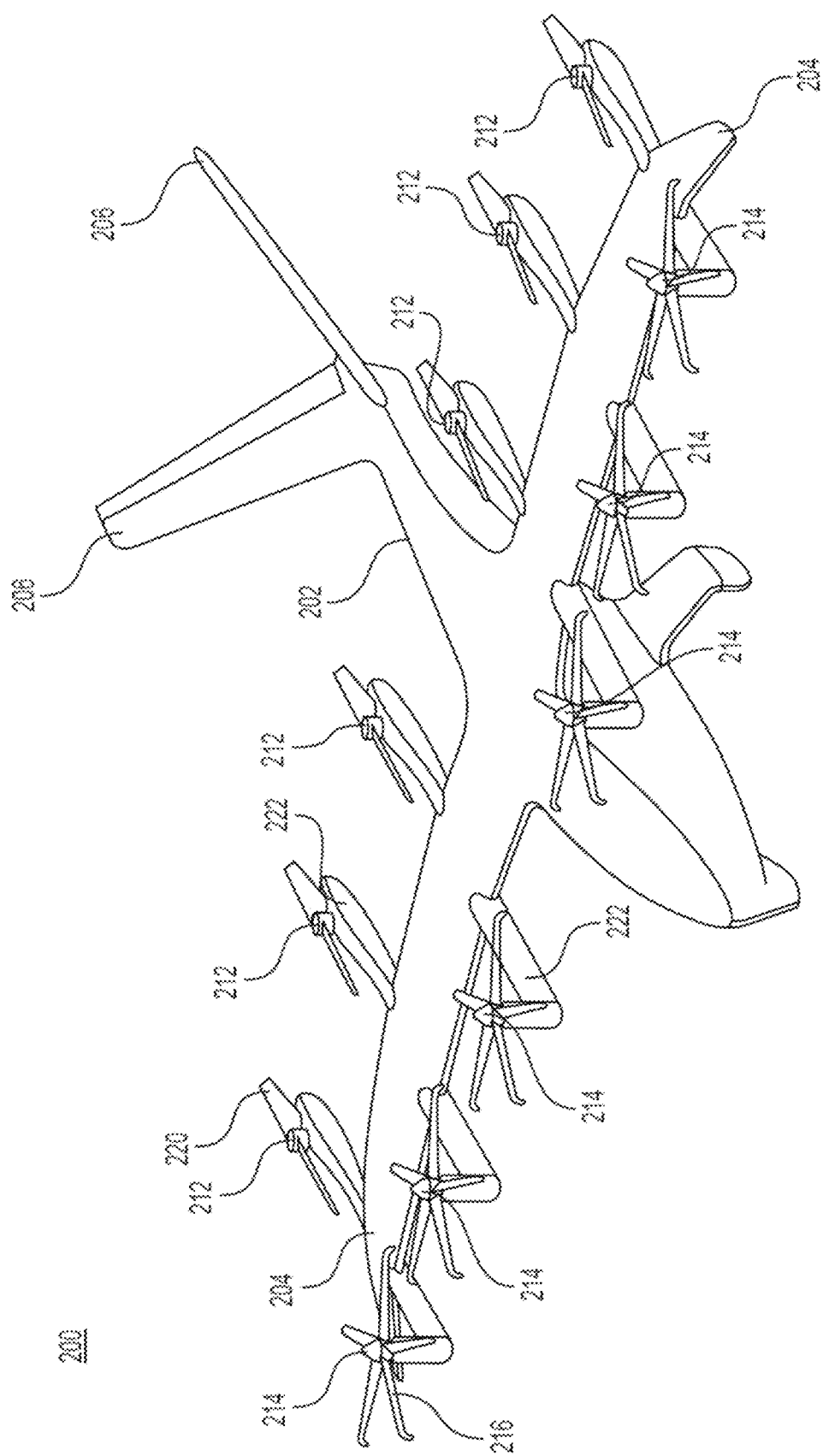
FIG. 2 shows an exemplary VTOL aircraft, consistent with disclosed embodiments.

FIG. 1 is an illustration of a perspective view of an exemplary VTOL aircraft, consistent with disclosed embodiments. FIG. 2 is another illustration of a perspective view of an exemplary VTOL aircraft in an alternative configuration, consistent with embodiments of the present disclosure. FIGS. 1 and 2 illustrate a VTOL aircraft 100, 200 in a cruise configuration and a vertical take-off, landing and hover configuration (also referred to herein as a "lift" configuration), respectively, consistent with embodiments of the present disclosure. Elements corresponding to FIGS. 1 and 2 may possess like numerals and refer to similar elements of the aircrafts 100, 200. The aircraft 100, 200 may include a fuselage 102, 202, wings 104, 204 mounted to the fuselage 102, 202 and one or more rear stabilizers 106, 206 mounted to the rear of the fuselage 102, 202. A plurality of lift propellers 112, 212 may be mounted to wings 104, 204 and may be configured to provide lift for vertical take-off, landing and hover. A plurality of tilt propellers 114, 214 may be mounted to wings 104, 204 and may be tiltable (e.g., configured to tilt or alter orientation) between the lift configuration in which they provide a portion of the lift required for vertical take-off, landing and hovering, as shown in FIG. 2, and the cruise configuration in which they provide forward thrust to aircraft 100 for horizontal flight, as shown in FIG. 1. As used herein, a tilt propeller lift configuration refers to any tilt propeller orientation in which the tilt propeller thrust is providing primarily lift to the aircraft and tilt propeller cruise configuration refers to any tilt propeller orientation in which the tilt propeller thrust is providing primarily forward thrust to the aircraft.

In some embodiments, lift propellers 112, 212 may be configured for providing lift only, with all horizontal propulsion being provided by the tilt propellers. For example, lift propellers 112, 212 may be configured with fixed positions and may only generate thrust during take-off, landing and hover phases of flight. Meanwhile, tilt propellers 114, 214 may be tilted upward into a lift configuration in which thrust from propellers 114, 214 is directed downward to provide additional lift.

For forward flight, tilt propellers 114, 214 may tilt from their lift configurations to their cruise configurations. In other words, the orientation of tilt propellers 114, 214 may be varied from an orientation in which the tilt propeller thrust is directed downward (to provide lift during vertical take-off, landing and hover) to an orientation in which the tilt propeller thrust is directed rearward (to provide forward thrust to aircraft 100, 200). The tilt propellers assembly for a particular electric engine may tilt about an axis of rotation defined by a mounting point connecting the boom and the electric engine. When the aircraft 100, 200 is in full forward flight, lift may be provided entirely by wings 104, 204. Meanwhile, in the cruise configuration, lift propellers 112, 212 may be shut off. The blades 120, 220 of lift propellers 112, 212 may be held in low-drag positions for aircraft cruising. In some embodiments, lift propellers 112, 212 may each have two blades 120, 220 that may be locked, for example while the aircraft is cruising, in minimum drag positions in which one blade is directly in front of the other blade as illustrated in FIG. 1. In some embodiments, lift propellers 112, 212 have more than two blades. In some embodiments, tilt propellers 114, 214 may include more blades 116, 216 than lift propellers 112, 212. For example, as illustrated in FIGS. 1 and 2, lift propellers 112, 212 may each include, e.g., two blades, whereas and tilt propellers 114, 214 may each include more blades, such as the five blades shown. In some embodiments, each of the tilt propellers 114, 214 may have 2 to 5 blades, and possibly more depending on the design considerations and requirements of the aircraft.

In some embodiments, the aircraft may include a single wing 104, 204 on each side of fuselage 102, 202 (or a single wing that extends across the entire aircraft). At least a portion of lift propellers 112, 212 may be located rearward of wings 104, 204 (e.g., rotation point of propeller is behind a wing from a bird's eye view) and at least a portion of tilt propellers 114, 214 may be located forward of wings 104, 204 (e.g., rotation point of propeller is in front of a wing from a bird's eye view). In some embodiments, all of lift propellers 112, 212 may be located rearward of wings 104, 204 and all of tilt propellers 114, 214 may be located forward of wings 104, 204. According to some embodiments, all lift propellers 112, 212 and tilt propellers 114, 214 may be mounted to the wings—e.g., no lift propellers or tilt propellers may be mounted to the fuselage. In some embodiments, lift propellers 112, 212 may be all located rearwardly of wings 104, 204 and tilt propellers 114, 214 may be all located forward of wings 104, 204. According to some embodiments, all lift propellers 112, 212 and tilt propellers 114, 214 may be positioned inwardly of the ends of the wing 104, 204.

In some embodiments, lift propellers 112, 212 and tilt propellers 114, 214 may be mounted to wings 104, 204 by booms 122, 222. Booms 122, 222 may be mounted beneath wings 104, 204, on top of the wings, and/or may be integrated into the wing profile. In some embodiments, lift propellers 112, 212 and tilt propellers 114, 214 may be mounted directly to wings 104, 204. In some embodiments, one lift propeller 112, 212 and one tilt propeller 114, 214 may be mounted to each boom 122, 222. Lift propeller 112, 212 may be mounted at a rear end of boom 122, 222 and tilt propeller 114, 214 may be mounted at a front end of boom 122, 222. In some embodiments, lift propeller 112, 212 may be mounted in a fixed position on boom 122, 222. In some embodiments, tilt propeller 114, 214 may mounted to a front end of boom 122, 222 via a hinge. Tilt propeller 114, 214 may be mounted to boom 122, 222 such that tilt propeller 114, 214 is aligned with the body of boom 122, 222 when in its cruise configuration, forming a continuous extension of the front end of boom 122, 222 that minimizes drag for forward flight.

In some embodiments, aircraft 100, 200 may include, e.g., one wing on each side of fuselage 102, 202 or a single wing that extends across the aircraft. According to some embodiments, the at least one wing 104, 204 is a high wing mounted to an upper side of fuselage 102, 202. According to some embodiments, the wings include control surfaces, such as flaps, ailerons, and/or flaperons (e.g., configured to perform functions of both flaps and ailerons). According to some embodiments, wings 104, 204 may have a profile that reduces drag during forward flight. In some embodiments, the wing tip profile may be curved and/or tapered to minimize drag.

In some embodiments, rear stabilizers 106, 206 include control surfaces, such as one or more rudders, one or more elevators, and/or one or more combined rudder-elevators. The wing(s) may have any suitable design for providing lift, directionality, stability, and/or any other characteristic beneficial for aircraft. In some embodiments, the wings have a tapering leading edge.

In some embodiments, lift propellers 112, 212 or tilt propellers 114, 214 may be canted relative to at least one other lift propeller 112, 212 or tilt propeller 114, 214, where canting refers to a relative orientation of the rotational axis of the lift propeller/tilt propeller about a line that is parallel to the forward-rearward direction, analogous to the roll degree of freedom of the aircraft.

In some embodiments, one or more lift propellers 112, 212 and/or tilt propellers 114, 214 may canted relative to a cabin of the aircraft, such that the rotational axis of the propeller in a lift configuration is angled away from an axis perpendicular to the top surface of the aircraft. For example, in some embodiments, the aircraft is a flying wing aircraft as shown in FIG. 9E below, and some or all of the propellers are canted away from the cabin.

Figure 3:
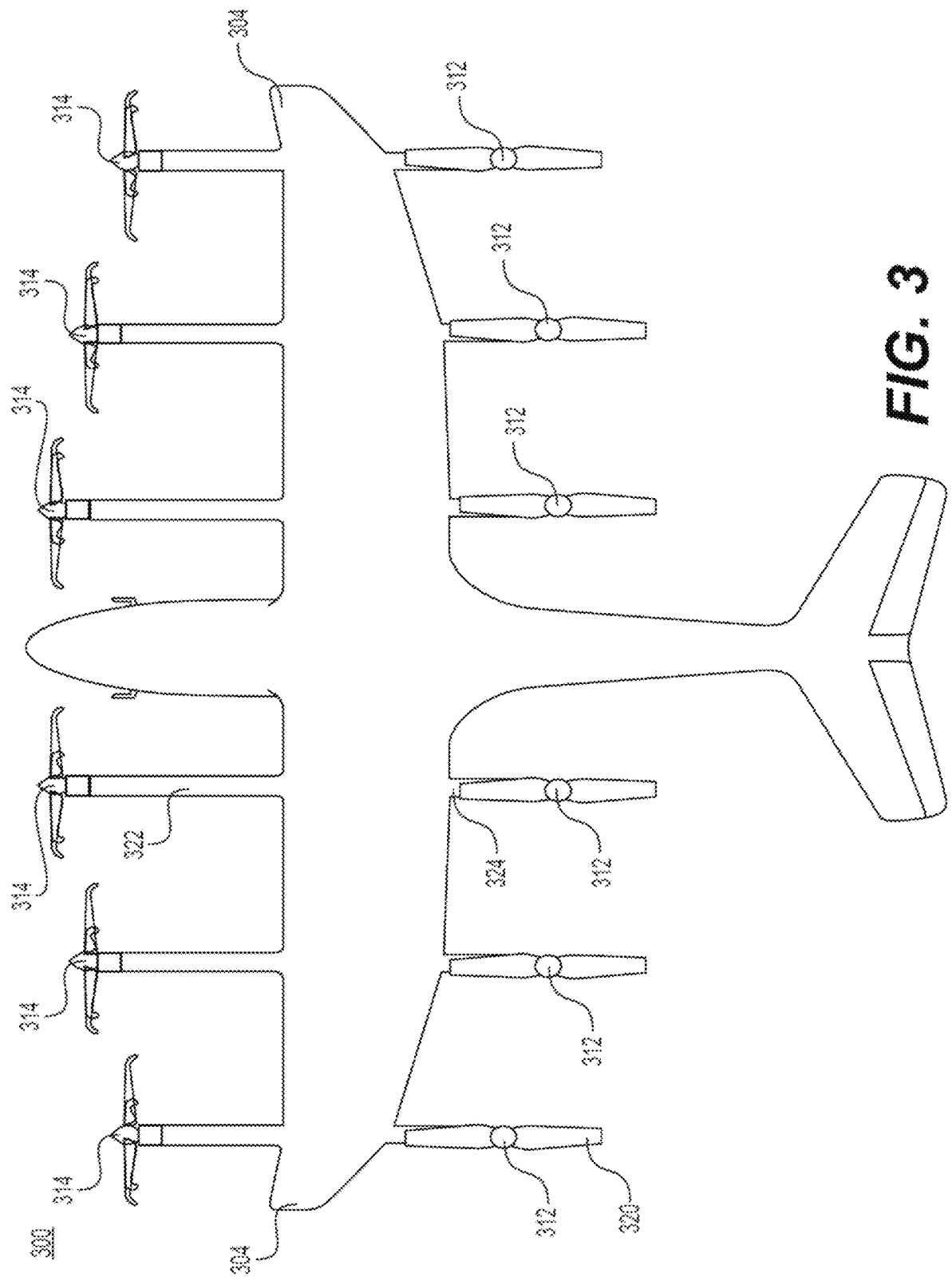
FIG. 3 shows an exemplary top plan view of a VTOL aircraft, consistent with disclosed embodiments.

FIG. 3 is an illustration of a top plan view of an exemplary VTOL aircraft, consistent with embodiments of the present disclosure. Aircraft 300 shown in the figure may be a top plan view of the aircraft 100, 200 shown in FIGS. 1 and 2, respectively. As discussed herein, an aircraft 300 may include twelve electric propulsion systems distributed across the aircraft 300. In some embodiments, a distribution of electric propulsion systems may include six forward electric propulsion systems 314 and six aft electric propulsion systems 312 mounted on booms forward and aft of the main wings 304 of the aircraft 300. In some embodiments, forward electric propulsion systems may be mounted to wings 304 by booms 322. In some embodiments, aft electric propulsion systems may be mounted to wings 304 by booms 324. In some embodiments, a length of the rear end of the boom 324 from the wing 304 to a lift propeller (part of electric propulsion system 312) may comprise a similar rear end of the boom 324 length across the numerous rear ends of the booms. In some embodiments, the length of the rear ends of the booms may vary, for example, across the six rear ends of the booms. Further, FIG. 3 depicts an exemplary embodiment of a VTOL aircraft 300 with forward propellers (part of electric propulsion system 314) in a horizontal orientation for horizontal flight and aft propeller blades 320 in a stowed position for a forward phase of flight.

Figure 4:
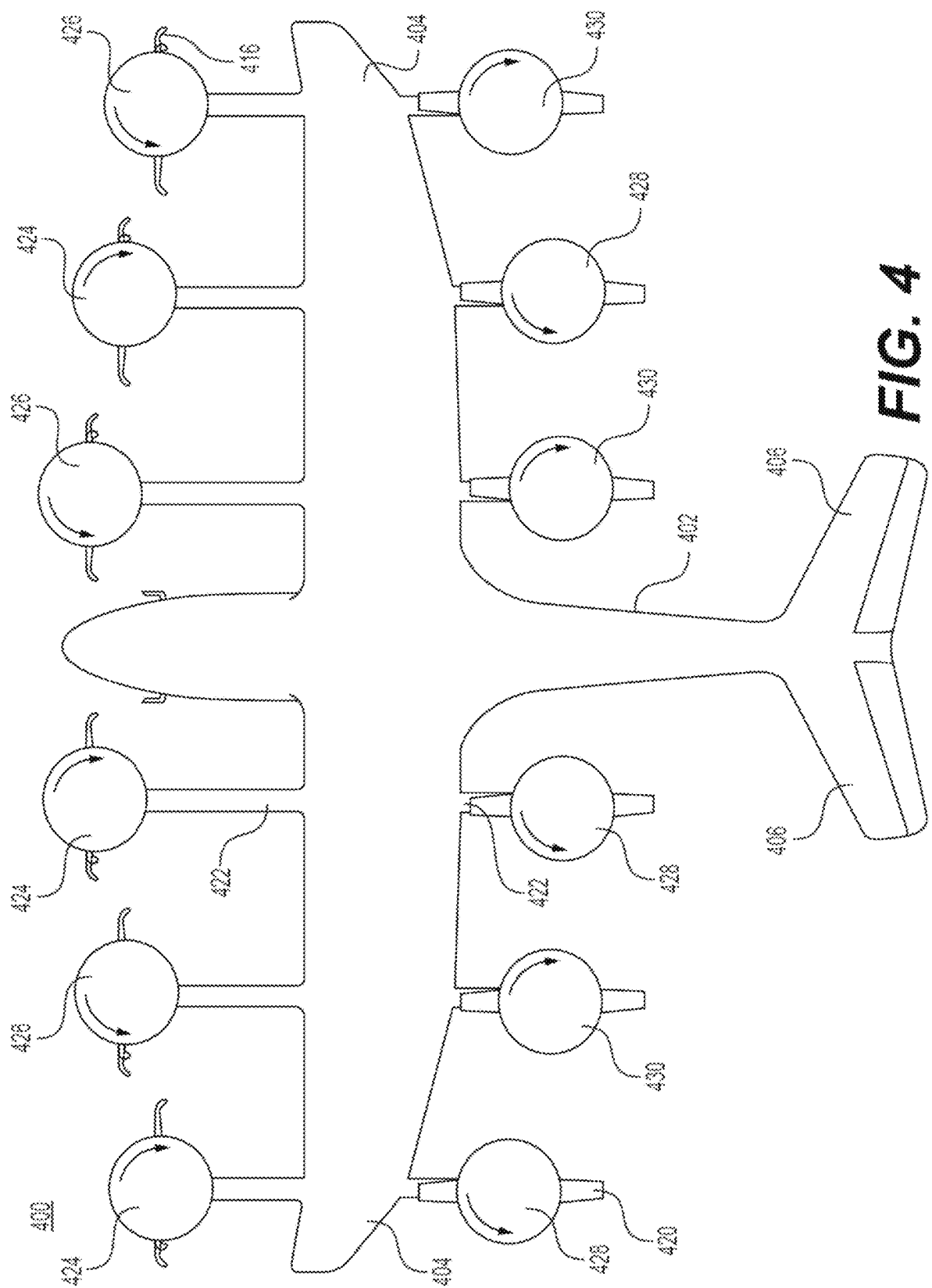
FIG. 4 illustrates exemplary propeller rotation of a VTOL aircraft, consistent with disclosed embodiments.

FIG. 4 is a schematic diagram illustrating exemplary propeller rotation of a VTOL aircraft, consistent with disclosed embodiments. Aircraft 400 shown in the figure may be a top plan view of the aircraft 100, 200, and 300 shown in FIGS. 1, 2, and 3, respectively. An aircraft 400 may include six forward electric propulsion systems with three of the forward electric propulsion systems being of CW type 424 and the remaining three forward electric propulsion systems being of CCW type 426. In some embodiments, three aft electric propulsion systems may be of CCW type 428 with the remaining three aft electric propulsion systems being of CW type 430. Some embodiments may include an aircraft 400 possessing four forward electric propulsion systems and four aft electric propulsion systems, each with two CW types and two CCW types. In some embodiments, aircraft 400 may include a fuselage 402, wing(s) 404 mounted to the fuselage 402, and one or more rear stabilizers 406 mounted to the rear of the fuselage 402. In some embodiments, each forward electric propulsion system may include propeller blades 416. In some embodiments, each aft electric propulsion system may include propeller blades 420. In some embodiments, electric propulsion systems may be mounted to wing(s) 404 by booms 422. In some embodiments, propellers may counter-rotate with respect to adjacent propellers to cancel torque steer, generated by the rotation of the propellers, experienced by the fuselage or wings of the aircraft. In some embodiments, the difference in rotation direction may be achieved using the direction of engine rotation. In other embodiments, the engines may all rotate in the same direction, and gearing may be used to achieve different propeller rotation directions.

Some embodiments may include an aircraft 400 possessing forward and aft electric propulsion systems where the amount of CW types 424 and CCW types 426 is not equal among the forward electric propulsion systems, among the aft electric propulsion systems, or among the forward and aft electric propulsion systems.

Figure 5:
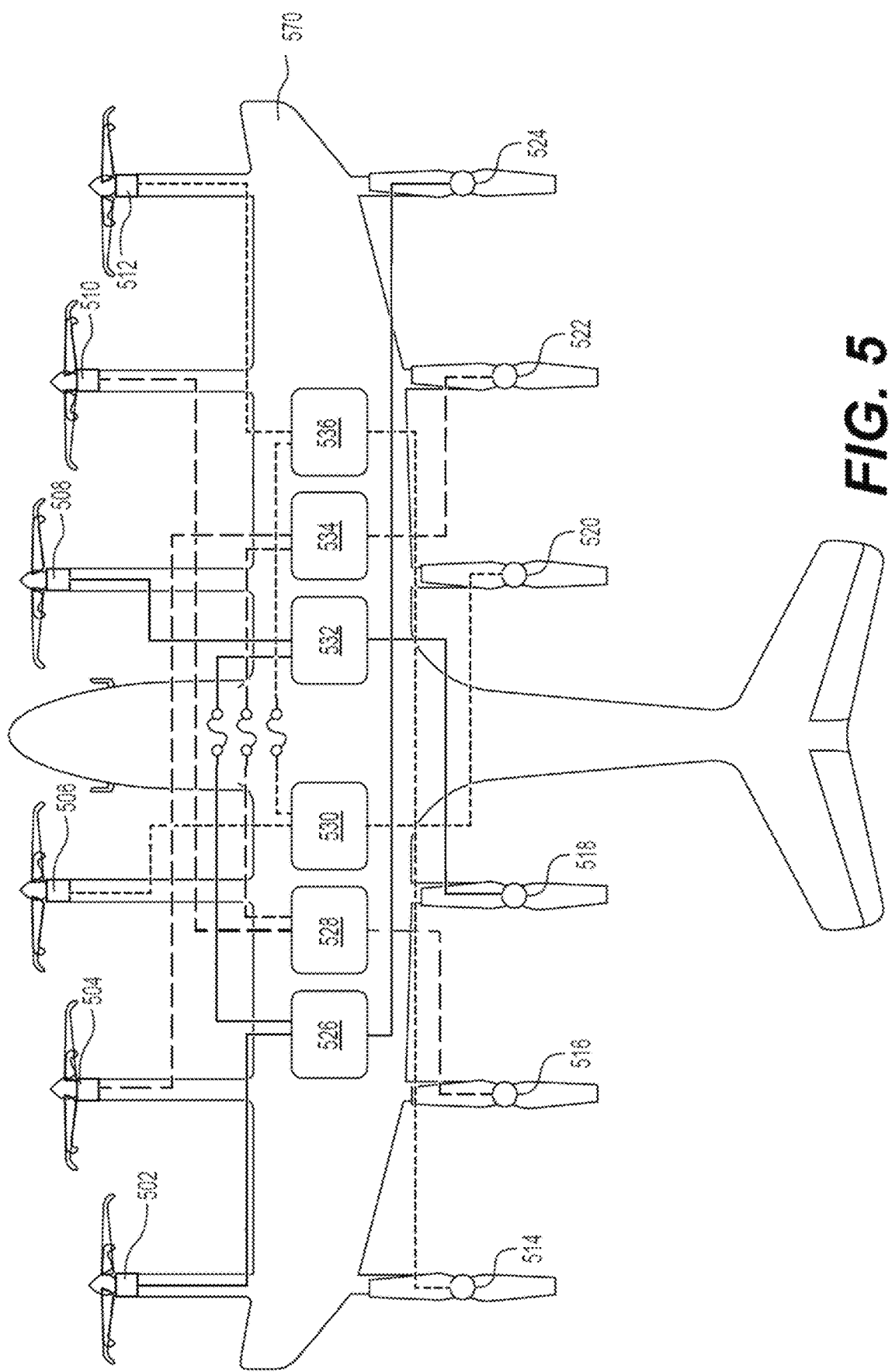
FIG. 5 shows exemplary power connections in a VTOL aircraft, consistent with disclosed embodiments.

FIG. 5 is a schematic diagram illustrating exemplary power connections in a VTOL aircraft, consistent with disclosed embodiments. A VTOL aircraft may have multiple power systems connected to diagonally opposing electric propulsion systems. In some embodiments, the power systems may include high voltage power systems. Some embodiments may include high voltage power systems connected to electric engines via high voltage channels. In some embodiments, an aircraft 500 may include six power systems (e.g., battery packs), including power systems 526, 528, 530, 532, 534, and 536 stored within the wing 570 of the aircraft 500. The power systems may power electric propulsion systems and/or other electric components of the aircraft 500. In some embodiments, the aircraft 500 may include six forward electric propulsion systems having six electric engines 502, 504, 506, 508, 510, and 512 and six aft electric propulsion systems having six electric engines 514, 516, 518, 520, 522, and 524. In some embodiments, one or more power systems (e.g., battery packs) may include a battery management system ("BMS") (e.g., one BMS for each battery pack). While six power systems are shown in FIG. 5, the aircraft 500 may include any number and/or configuration of power systems.

Figure 6:
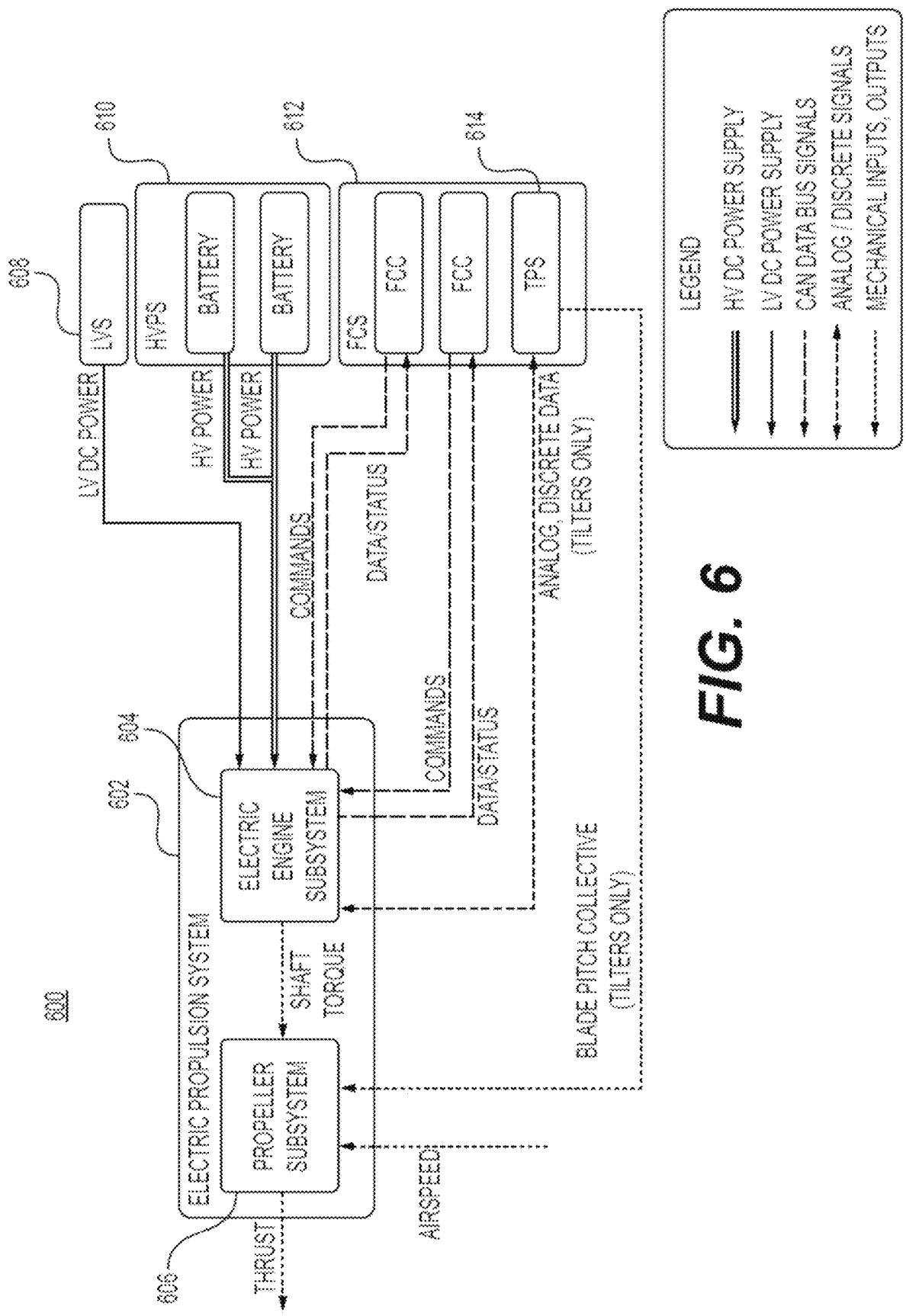
FIG. 6 shows an exemplary architecture of an electric propulsion unit, consistent with disclosed embodiments.

In some embodiments, the one or more battery management systems may communicate with a Flight Control System ("FCS") of the aircraft (e.g., FCS 612 shown in FIG. 6). For example, the FCS may monitor the status of one or more battery packs and/or provide commands to the one or more battery management systems which make corresponding adjustments to the high voltage power supply.

FIG. 6 illustrates block diagram of an exemplary architecture and design of an electric propulsion unit 600 consistent with disclosed embodiments. Exemplary electric propulsion unit 600 includes an electric propulsion system 602, which may be configured to control aircraft propellers. Electric propulsion system 602 may include an electric engine subsystem 604 that may supply torque, via a shaft, to a propeller subsystem 606 to produce the thrust of the electric propulsion system 602. Some embodiments may include the electric engine subsystem 604 receiving low voltage direct current (LV DC) power from a Low Voltage System (LVS) 608. In some embodiments, the electric engine subsystem 604 may be configured to receive high voltage (HV) power from a High Voltage Power System (HVPS) 610 comprising at least one battery or other device capable of storing energy. HV power may refer to power that is greater or higher in voltage than voltage provided by Low Voltage System (LVS) 608.

Some embodiments may include an electric propulsion system 602 including an electric engine subsystem 604 receiving signals from and sending signals to a flight control system 612. In some embodiments, a flight control system (FCS) 612 may comprise a flight control computer (FCC) capable of using Controller Area Network ("CAN") data bus signals to send commands to the electric engine subsystem 604 and receive status and data from the electric engine subsystem 604. An FCC may include a device configured to perform one or more operations (e.g., computational operations) for an aircraft, such as at least one processor and a memory component, which may store instructions executable by the at least one processor to perform the operations, consistent with disclosed embodiments. It should be understood that while CAN data bus signals are used between the flight control computer and the electric engine(s), some embodiments may include any form of communication with the ability to send and receive data from a flight control computer to an electric engine. Some embodiments may include electric engine subsystems 604 capable of receiving operating parameters from and communicating operating parameters to an FCC in FCS 612, including speed, voltage, current, torque, temperature, vibration, propeller position, and/or any other value of operating parameters.

In some embodiments, a flight control system 612 may also include a Tilt Propeller System ("TPS") 614 capable of sending and receiving analog, discrete data to and from the electric engine subsystem 604 of the tilt propellers. A tilt propeller system (TPS) 614 may include an apparatus capable of communicating operating parameters to an electric engine subsystem 604 and articulating an orientation of the propeller subsystem 606 to redirect the thrust of the tilt propellers during various phases of flight using mechanical means such as a gearbox assembly, linear actuators, and any other configuration of components to alter an orientation of the propeller subsystem 606. In some embodiments, electric engine subsystem may communicate an orientation of the propeller system (e.g., an angle between lift and forward thrust) to TPS 614 and/or FCS 612 (e.g., during flight).

FIGS. 7A-7F are illustrations of a top plan view of exemplary VTOL aircrafts, consistent with embodiments of the present disclosure. There may be a number of design considerations (cost, weight, size, performance capability etc.) that may influence the number and/or combination of tilt and lift propellers in a VTOL aircraft.

FIG. 7A illustrates an arrangement of electric propulsion units, consistent with embodiments of the present disclosure. Referring to FIG. 7A, the aircraft shown in the figure may be a top plan view of an exemplary aircraft (e.g., a VTOL aircraft). The aircraft may include twelve electric propulsion systems distributed across the aircraft. In some embodiments, a distribution of electric propulsion systems may include six forward electric propulsion systems (701, 702, 703, 704, 705, and 706) and six aft electric propulsion systems (707, 708, 709, 710, 711, and 712). In some embodiments, the six forward electric propulsion systems may be operatively connected to tilt propellers and the six aft electric propulsion systems may be operatively connected to lift propellers. In other embodiments, the six forward electric propulsion systems and a number of aft electric propulsion systems may be operatively connected to tilt propellers and the remaining aft electric propulsion systems may be operatively connected to lift propellers. In other embodiments, all forward and aft electric propulsion systems may be operatively coupled to tilt propellers.

FIG. 7B illustrates an alternate arrangement of electric propulsion units, consistent with embodiments of the present disclosure. Referring to FIG. 7B, the aircraft shown in the figure may be a top plan view of an exemplary aircraft (e.g., a VTOL aircraft). The aircraft may include eight electric propulsion systems distributed across the aircraft. In some embodiments, a distribution of electric propulsion systems may include four forward electric propulsion systems (713, 714, 715, and 716) and four aft electric propulsion systems (717, 718, 719, and 720). In some embodiments, the four forward electric propulsion systems may be operatively connected to tilt propellers and the four aft electric propulsion systems may be operatively connected to lift propellers. In other embodiments, the four forward electric propulsion systems and a number of aft electric propulsion systems may be operatively connected to tilt propellers and the remaining aft electric propulsion systems may be operatively connected to lift propellers. In other embodiments, all forward and aft electric propulsion systems may be operatively coupled to tilt propellers.

FIG. 7C illustrates an alternate arrangement of electric propulsion units, consistent with embodiments of the present disclosure. Referring to FIG. 7C, the aircraft shown in the figure may be a top plan view of an exemplary aircraft (e.g., a VTOL aircraft). The aircraft may include six electric propulsion systems distributed across the aircraft. In some embodiments, a distribution of electric propulsion systems may include a first set of four electric propulsion systems 721, 722, 723, and 724 coplanar in a first plane and a second set of two electric propulsion systems 725 and 726 coplanar in a second plane. In some embodiments, the first set of electric propulsion systems 721-724 may be operatively connected to tilt propellers and second set of electric propulsion systems 725 and 726 may be operatively connected to lift propellers. In other embodiments, the first set of electric propulsion systems 721-724 and the second set of aft electric propulsion systems 725 and 726 may all be operatively connected to tilt propellers.

FIG. 7D illustrates an alternate arrangement of electric propulsion units, consistent with embodiments of the present disclosure. Referring to FIG. 7D, the aircraft shown in the figure may be a top plan view of an exemplary aircraft (e.g., a VTOL aircraft). The aircraft may include four electric propulsion systems distributed across the aircraft. In some embodiments, a distribution of electric propulsion systems may include four coplanar electric propulsion systems 727, 728, 729, and 730. In some embodiments, all of the electric propulsion systems may be operatively connected to tilt propellers.

FIG. 7E illustrates an alternate arrangement of electric propulsion units, consistent with embodiments of the present disclosure. Referring to FIG. 7E, the aircraft shown in the figure may be a top plan view of an exemplary aircraft (e.g., a VTOL aircraft). The aircraft may include six electric propulsion systems distributed across the aircraft. For example, in some embodiments, the aircraft may include four forward electric propulsion systems 731, 732, 733, and 734 operatively connected to tilt propellers and the two aft ducted fans 735 and 736 operatively connected to lift propellers. In some embodiments, the aircraft may include ten electric propulsion systems distributed across the aircraft. For example, in some embodiments, the aircraft may include six forward electric propulsion systems operatively connected to tilt propellers and the four aft electric propulsion systems operatively connected to lift propellers. In some embodiments, some or all of the aft electric propulsion systems may operatively connected to tilt propellers.

As shown in FIG. 7E, in some embodiments, the aircraft may have a flying wing configuration, such as a tailless fixed-wing aircraft with no definite fuselage. In some embodiments, the aircraft may have a flying wing configuration with the fuselage integrated into the wing. In some embodiments, the tilt propellers may rotate in a plane above the body of the aircraft when the tilt propellers operate in a lift configuration.

FIG. 7F illustrates an alternate arrangement of electric propulsion units, consistent with the embodiments of the present disclosure. Referring to FIG. 7F, the aircraft may be a top plan view of an exemplary aircraft. In some embodiments, the aircraft may include ducted fans 737, 738, 739, and 740 operably connected to the electric propulsion systems. In some embodiments the aircraft may include a bank of ducted fans on each wing of the aircraft and the bank of ducted fans may be connected to tilt together (e.g., between lift and forward thrust configuration). In some embodiments the aircraft includes a left and right front wing and a left and right rear wing. In some embodiments, each wing of the aircraft includes a bank of connected ducted fans. In some embodiments, each bank of connected ducted fans are tiltable (e.g., between lift and forward thrust), while in other embodiments only the bank of fans on the front wing(s) are tiltable.

As disclosed herein, the forward electric propulsion systems and aft electric propulsion systems may be of a clockwise (CW) type or counterclockwise (CCW) type. Some embodiments may include various forward electric propulsion systems possessing a mixture of both CW and CCW types. In some embodiments, the aft electric propulsion systems may possess a mixture of CW and CCW type systems among the aft electric propulsion systems. In some embodiments, each electric propulsion systems may be fixed as clockwise (CW) type or counterclockwise (CCW) type, while in other embodiments, one or more electric propulsion systems may vary between clockwise (CW) and counterclockwise (CCW) rotation.

—New, Application-Specific Description—

Figure 8A:
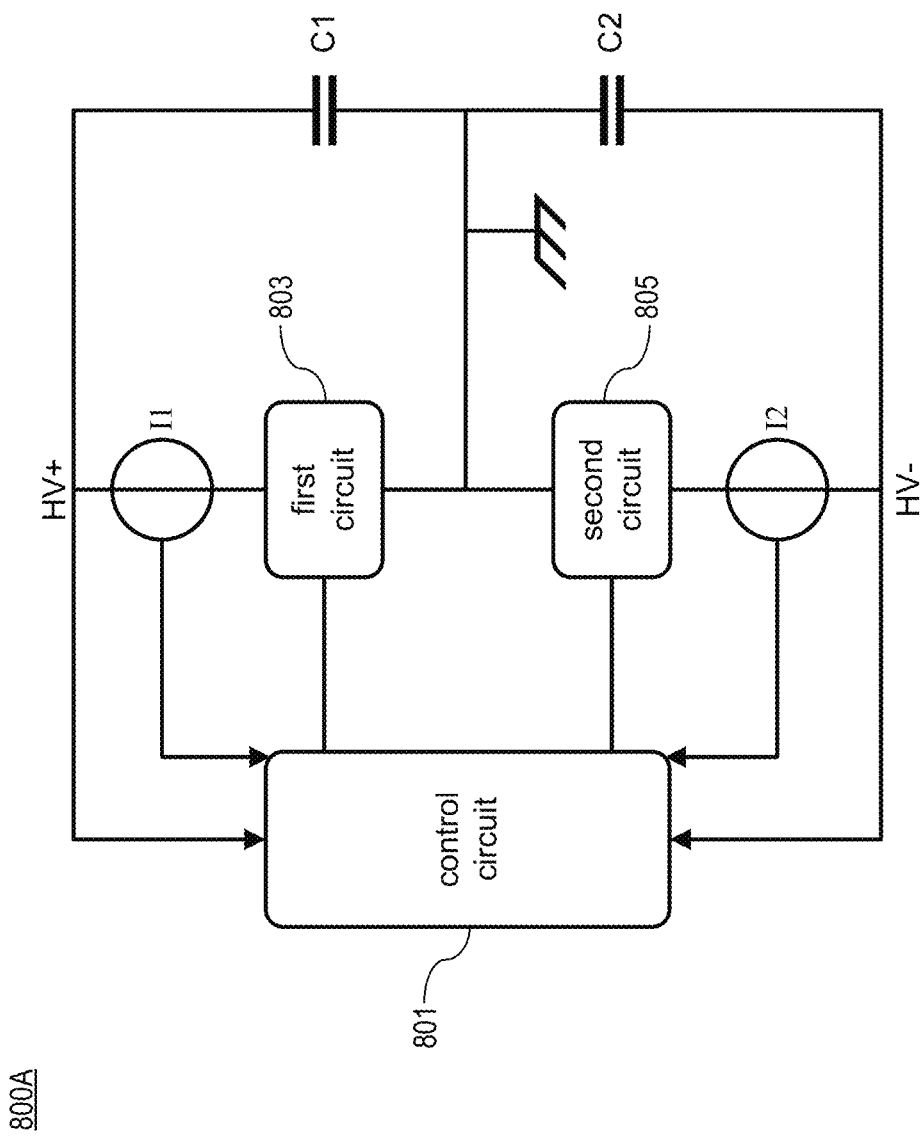
FIGS. 8A-8B illustrate an exemplary balancing and measuring circuit, consistent with disclosed embodiments.
Figure 8B:
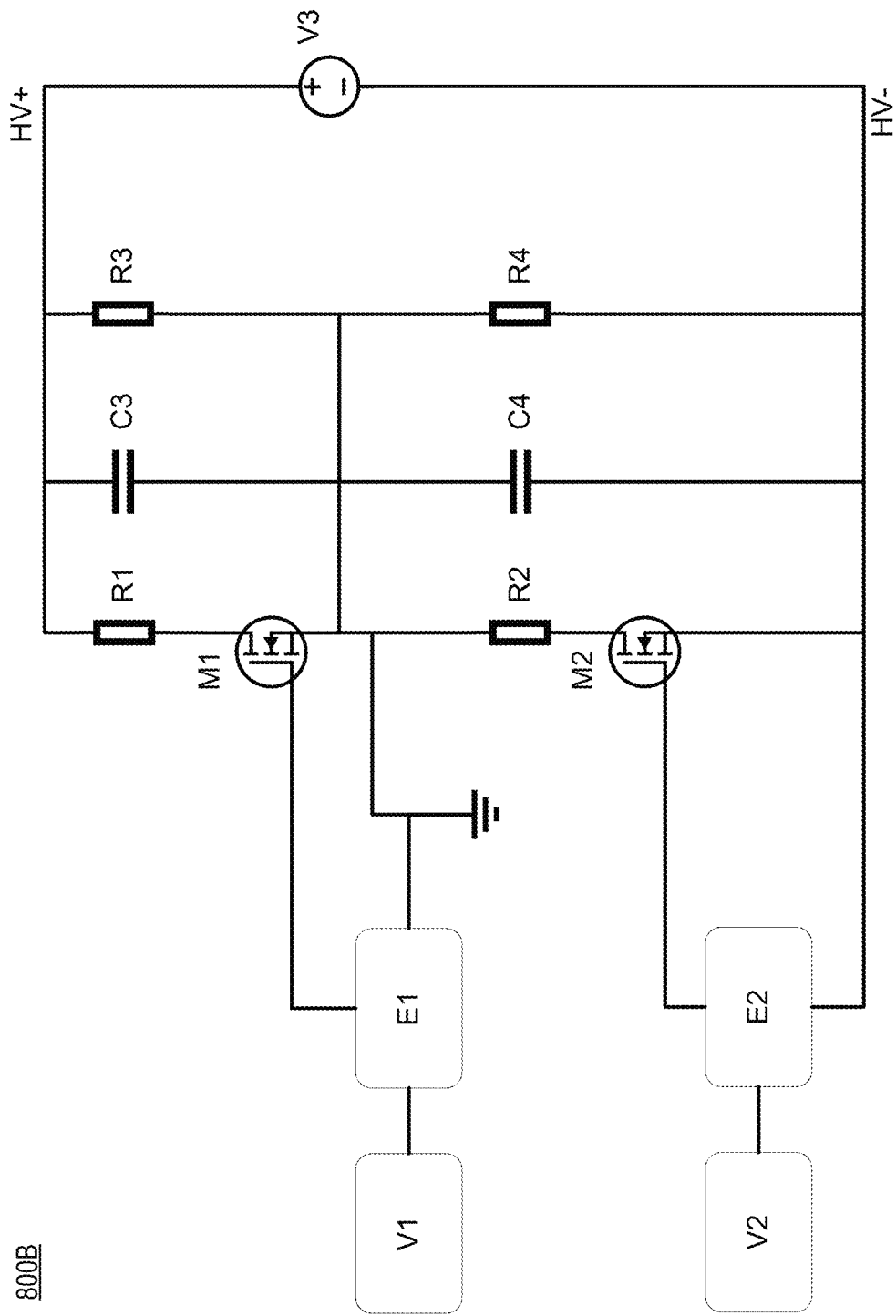

FIGS. 8A-8B illustrate an exemplary balancing and measuring circuit, consistent with disclosed embodiments. Exemplary balancing and measuring circuits 800A and 800B may be implemented in any high voltage system, including, by way of non-limiting example, a high voltage power system in an electric or hybrid vehicle (e.g., aircraft, car). For example, one or both of balancing and measuring circuits 800A and 800B may be coupled (e.g., electrically connected) to a high voltage bus and/or one or more battery packs of an aircraft. Unless otherwise stated (for example, according to the phrase "operatively coupled"), as used herein, "coupled" refers to being electrically connected.

As depicted in FIG. 8A, balancing and measuring circuit 800A may include a control circuit 801, a first circuit 803, a second circuit 805, a first current sensor I1, a second current sensor I2, a first capacitor C1, and a second capacitor C2. Balancing and measuring circuit 800A may be implemented in a high voltage system with a positive high voltage line (HV+) and a negative high voltage line (HV−). In some embodiments, a current sensor may be configured to measure a current associated with a component to be monitored by a balancing and measuring circuit. Additionally or alternatively, in some embodiments, a voltage sensor may be configured to measure a voltage associated with a component to be monitored by a balancing and measuring circuit. In general, it may be understood that first current sensor I1 and second current sensor I2 may be implemented as one or more current sensors, voltage sensors, any combination of the two, or any other sensor or combination of sensors configured to measure a characteristic associated with a component to be monitored by a balancing and measuring circuit.

In some embodiments, a sensor may be configured to measure a value of a component. For example, as depicted in FIG. 8A, current sensor I1 may be configured to measure a current of at least one component of first circuit 803 (e.g., a switching element, a capacitor). Further, current sensor I2 may be configured to measure a current of at least one component of second circuit 805 (e.g., a switching element, a capacitor). In some embodiments, a current of a switching element may be substantially equal to a current of a reference capacitor, which may be any capacitor in a circuit, such as an opposite capacitor discussed in the next paragraph. For example, the current of a component of first circuit 803 (e.g., a switching element) may correspond (e.g., substantially equal) to a current of capacitor C2, and the current of a component of second circuit 805 (e.g., a switching element) may correspond (e.g., substantially equal) to a current of capacitor C1.

An opposite capacitor may refer to a capacitor that, relative to a first circuit, is not wired in parallel with the first circuit and/or is electrically connected in parallel with a second circuit. For example and as depicted in FIG. 8A, an opposite capacitor of first circuit 803 is capacitor C2, and an opposite capacitor of second circuit 805 is capacitor C1. Further, with reference to FIG. 8B, C4 is an opposite capacitor of controller E1, resistive element R1, and switching element M1, and C3 is an opposite capacitor of controller E2, resistive element R2, and switching element M2.

In some embodiments, a voltage of a switching element may be substantially equal to a current of a reference capacitor. For example, when current sensors I1 and I2 are implemented as voltage sensors or include an additional voltage sensor, the voltage of a component of first circuit 803 (e.g., a switching element) may correspond (e.g., substantially equal) to a voltage of capacitor C2, and the voltage of a component of second circuit 805 (e.g., a switching element) may correspond (e.g., substantially equal) to a voltage of capacitor C1.

Further, as depicted in FIG. 8B, balancing and measuring circuit 800B may include a first resistive element R1, a first switching element M1, a first voltage circuit V1, a first controller E1 (together which may correspond to first circuit 803 and control circuit 801), and a first capacitor C3 (which may correspond to C1), which together are associated with a first leakage R3. Balancing and measuring circuit 800B may further include a second resistive element R2, a second switching element M2, a second voltage circuit V2, a second controller E2 (together which may correspond to second circuit 805 and control circuit 801), and a second capacitor C4 (which may correspond to C2), which together are associated with a second leakage R4. Leakage may refer to a gradual transfer of electrical energy across a boundary normally viewed as insulating. For example, leakage may include leakage current flowing through a Class Y capacitor of an EMI filter of a high voltage system. While some systems may be designed to tolerate some amount of leakage, excessive leakage can increase the risk of, for example, hazardous electric shock to users of the system.

In general, it may be understood that balancing and measuring circuit 800B and its circuit components depicted in FIG. 8B are an exemplary embodiment of balancing and measuring circuit 800A depicted in FIG. 8A and that similar or different suitable circuit components may be used to accomplish a same or similar effect according to the disclosed embodiments herein. While not depicted in FIG. 8A or FIG. 8B, their respective positive high voltage lines (HV+) and negative high voltage lines (HV−) may be coupled to additional components within a system, such as a high voltage bus, one or more EPUs, one or more batteries, one or more motors, and/or any other system component configured to draw high voltage power.

Further, it may be understood that the depictions of a single component may represent a simplified circuit diagram and implementations of the disclosed embodiments may include any number of same elements. For example, while FIGS. 8A and 8B depict single capacitors, each of C1, C2, C3, and C4 may be implemented as any number of electrically coupled capacitive elements, the effective capacitance of which may be represented by a single capacitor in a circuit diagram. In general, any component depicted in FIGS. 8A and 8B may be implemented as any number of similar or same, coupled components.

FIGS. 8A and 8B depict a chassis ground and a reference ground, respectively. A chassis ground may refer to a connection or coupling point where the metal chassis or enclosure of a device, circuit, or system is used as a grounding reference. For example, a chassis may refer to the metal frame, mesh, or body of a machine, piece of equipment, or vehicle (e.g., aircraft, car). In some embodiments, a chassis voltage (e.g., ground) may be between a positive high voltage line or rail (HV+) and a negative high voltage line or rail (HV−). In general, the disclosed embodiments may utilize any reference ground.

FIG. 8B depicts a voltage source V3. Voltage source V3 may represent a high voltage power supply (e.g., battery, battery pack) of a system. For example, voltage source V3 may supply a high voltage (e.g., 400 V, 800 V) to a system and may effectively provide a positive high voltage to HV+ relative to the chassis ground (e.g., +200 V, +400 V) and a negative high voltage to HV− relative to the chassis ground (e.g., −200 V, −400 V).

In some embodiments, a first terminal of a first capacitor may be coupled (e.g., electrically connected) to a first resistive element and a second terminal of the first capacitor may be coupled to a first switching element. For example and with reference to FIG. 8B, a first terminal of capacitor C3 is coupled to first resistive element R1, and a second terminal of capacitor C3 is coupled to first switching element M1. Optionally, in some embodiments, the first terminal of the first capacitor is a positive terminal and the second terminal of the capacitor is a negative terminal. In other embodiments, the first terminal of the first capacitor is a negative terminal and the second terminal of the capacitor is a positive terminal.

In some embodiments, a first terminal (e.g., third terminal when including the first and second terminals of the first capacitor) of a second capacitor may be coupled (e.g., electrically connected) to a second resistive element and a second terminal (e.g., fourth terminal when including the first and second terminals of the first capacitor) of the second capacitor may be coupled to a second switching element. For example and with reference to FIG. 8B, a first terminal of capacitor C4 is coupled to second resistive element R2, and a second terminal of capacitor C4 is coupled to second switching element M2. Optionally, in some embodiments, the first terminal of the second capacitor is a positive terminal and the second terminal of the second capacitor is a negative terminal. In other embodiments, the first terminal of the second capacitor is a negative terminal and the second terminal of the second capacitor is a positive terminal.

In some embodiments, a control circuit may include one or more processing components. For example, control circuit 801 may include a compensator, a processor, an operational amplifier, any combination of the foregoing, or any other processing component or circuitry and may correspond to first controller E1 or second controller E2.

In some embodiments, control circuit 801 may further include one or more voltage circuits. A voltage circuit may refer to one or more components that are configured to generate, provide, or output a voltage. For example, a voltage circuit may include a voltage sensor, a voltage divider, a voltage source, any combination of the foregoing, or any other circuit components and may correspond to first voltage circuit V1 or second voltage circuit V2. In some embodiments, a voltage circuit may be configured to detect, measure, connect to, and/or receive a voltage. For example, the voltage circuit may be coupled to a voltage source (e.g., HV+, HV−, battery, etc.). In some embodiments, a voltage circuit may be configured to provide a reference voltage to one or more processing elements of control circuit 801. For example, the reference voltage may be a target voltage to be maintained across a component (e.g., capacitor). In some embodiments, a reference voltage may be equal to, or equal to within a predetermined tolerance threshold, a proportion of a measured voltage, such as half of a measured voltage. The measured voltage may be equal to, or equal to within a predetermined tolerance threshold, the voltage of a coupled voltage source (e.g., HV+, HV−, battery, etc.). In some embodiments, control circuit 801 may store a reference voltage value in memory and/or modify the value according to certain procedures, as discussed further below.

In some embodiments, at least one of (e.g., each) of first circuit 803 and second circuit 805 may include at least one resistive element and at least one switching element. A resistive element may refer to a component or part of a circuit configured to provide a resistance to a flow of electric current. For example, a resistive element may be implemented as one or more resistors and/or one or more diodes (e.g., reverse diodes) and may correspond to first resistive element R1 or second resistive element R2. In some embodiments, each resistive element may have a resistance greater than or equal to a minimum insulation resistance. For example, each resistive element may be selected or designed to have a resistance greater than or equal to a minimum insulation resistance of the high voltage system (e.g., as determined by a standard, such as those provided by IEEE, IEC, ISO, and/or SAE). Additionally or alternatively, each resistive element may have a resistance (e.g., resistance value) selected to reduce a shock voltage potential below a shock threshold. For example, each resistive element may have a resistance value greater than or equal to 500 ohms per volt of the system (e.g., 400 kiloohms or greater for an 800 V system, 200 kiloohms or greater for a 400 V system).

A switching element may refer to a component or part of a circuit configured to control a flow of electric current by opening or closing a circuit or by changing a conducting state. For example, a switching element may be implemented as one or more switches, transistors (e.g., bipolar junction transistor or "BJT," metal-oxide-semiconductor field-effect transistor or "MOSFET"), or a relay and may correspond to first switching element M1 or second switching element M2. In some embodiments, the resistive element and the switching element may be connected in series.

In some embodiments, at least one of (e.g., each) of first circuit 803 and second circuit 805 may further include a current-blocking element coupled between the resistive element and the switching element. A current-blocking element may refer to a component or part of a circuit configured to block (partially or totally) the flow of electric current. For example, a current-blocking element may be implemented as a unidirectional blocking transistor (e.g., field-effect transistor or "FET") or a bidirectional blocking transistor (e.g., FET). The current-blocking element may provide protection to the high voltage system if a corresponding switching element fails short. Further, the current-blocking element may be used to perform safety testing of the balancing and measuring circuit. For example, the current-blocking element may be used to implement a Hi-POT (high potential) test.

In some embodiments, a control circuit may be configured to control a switching element using analog control. Additionally or alternatively, in some embodiments, a control circuit may be configured to control a switching element using pulse-width modulation (PWM) control. In some embodiments, a control circuit may be configured to switch between controlling a switching element using analog control and controlling the switching element using PWM control. For example, a control circuit may be configured to switch between analog control and PWM control based on a received signal from a central processor (e.g., FCC of an aircraft).

In some embodiments, a balancing and measuring circuit may be configured to balance a voltage across a component. For example, balancing and measuring circuit 800A, may be configured to balance a voltage across capacitor C1 and a voltage across capacitor C2. As another non-limiting example, balancing and measuring circuit 800B may be configured to balance a voltage across capacitor C3 and a voltage across capacitor C4. The voltage across capacitors C1 and C2, and/or across C3 and C4, may be unbalanced due to leakage between HV+ and ground (e.g., chassis) and leakage between HV− and ground (e.g., chassis). Further, the unbalanced voltages may be dependent on the ratio of the leakage currents from HV+ to chassis and HV− to chassis. Even if both leakage currents are relatively small, the dependency on the ratio of the leakage currents can cause large voltage imbalances (e.g., 720 V across C1 and 80 V across C2 in an 800 V system, 720 V across C3 and 80 V across C4 in an 800 V system). This large imbalance decreases the lifespan of the capacitors and requires more specialized capacitors designed to handle (e.g., operate under) higher voltages.

In some embodiments, a control circuit may be configured to include a closed loop control process. For example, a control circuit (e.g., control circuit 801, controller E1, controller E2) may be configured to balance a voltage across a capacitor using a closed loop control process (e.g., proportional-integral control, proportional-integral-derivative control, etc.). The control circuit may be configured to drive a gate voltage of a switching element until (e.g., ceasing to drive the gate voltage or lowering the gate voltage below a gate threshold voltage of the switching element when it determines that) the leakage impedance associated with one capacitor is equal to, or equal to within a predetermined tolerance threshold, a combined impedance of a resistive element, switching element, and any leakage. Then, because the reference voltage is, for example, half of the measured voltage (e.g., system voltage) the voltage across the capacitor and the voltage across the resistive element, switching element, and any leakage is equal or substantially equal.

For example and with reference to FIG. 8B, controller E1 may be configured to monitor a voltage and/or current of capacitor C4 (e.g., by measuring a voltage and/or current, such as voltage and/or current of switching element M1), and controller E2 may be configured to monitor a voltage and/or current of capacitor C3 (e.g., by measuring a voltage and/or current of switching element M2). Further and with reference to FIG. 8A, control circuit 801 may be configured to monitor a voltage and/or current of capacitor C2 (e.g., by receiving a voltage and/or current measurement from sensor I1) and to monitor a voltage and/or current of capacitor C1 (e.g., by receiving a voltage and/or current measurement from sensor I2). In general, it may be understood that an exemplary balancing and measuring circuit (e.g., 800A, 800B) may be configured to monitor a voltage and/or current of a capacitor by measuring a voltage and/or current of a reference component (e.g., switching element via one or more sensors, component opposite to another as the opposite capacitor discussed above).

In some embodiments, balancing and measuring circuit 800A and/or 800B may be configured to measure an impedance. For example, balancing and measuring circuit 800A may be configured to measure a leakage impedance of the high voltage system by measuring an impedance associated with capacitor C1 and an impedance associated with capacitor C2. Additionally, for example, balancing and measuring circuit 800B may be configured to measure a leakage impedance of the high voltage system by measuring an impedance associated with capacitor C3 (e.g., as represented by R3 in FIG. 8B) and an impedance associated with capacitor C4 (e.g., as represented by R4 in FIG. 8B). By way of non-limiting example, measuring a leakage impedance may include at least one control circuit (e.g., control circuit 801, first controller E1, second controller E2) measuring (e.g., independently, when multiple control circuits are making a measurement) a first impedance of a capacitor (e.g., capacitor C1, C2, C3, C4). Then the at least one control circuit may modify (e.g., multiplying, adding) a reference voltage (e.g., independently modifying, for embodiments where multiple control circuits are modifying) received from a voltage circuit (e.g., first voltage circuit V1, second voltage circuit V2) by a predetermined value. Because the reference voltage has been modified by a predetermined value, the control circuit will drive a gate voltage of a switching element and modify the voltage (and impedance) across a capacitor by a known amount (e.g., based on the modified reference voltage). The control circuit may be configured to determine (e.g., independently determining, for embodiments where multiple control circuits are modifying) the leakage impedance, for example by comparing the initial impedance of the capacitor with the second impedance.

Figure 9A:
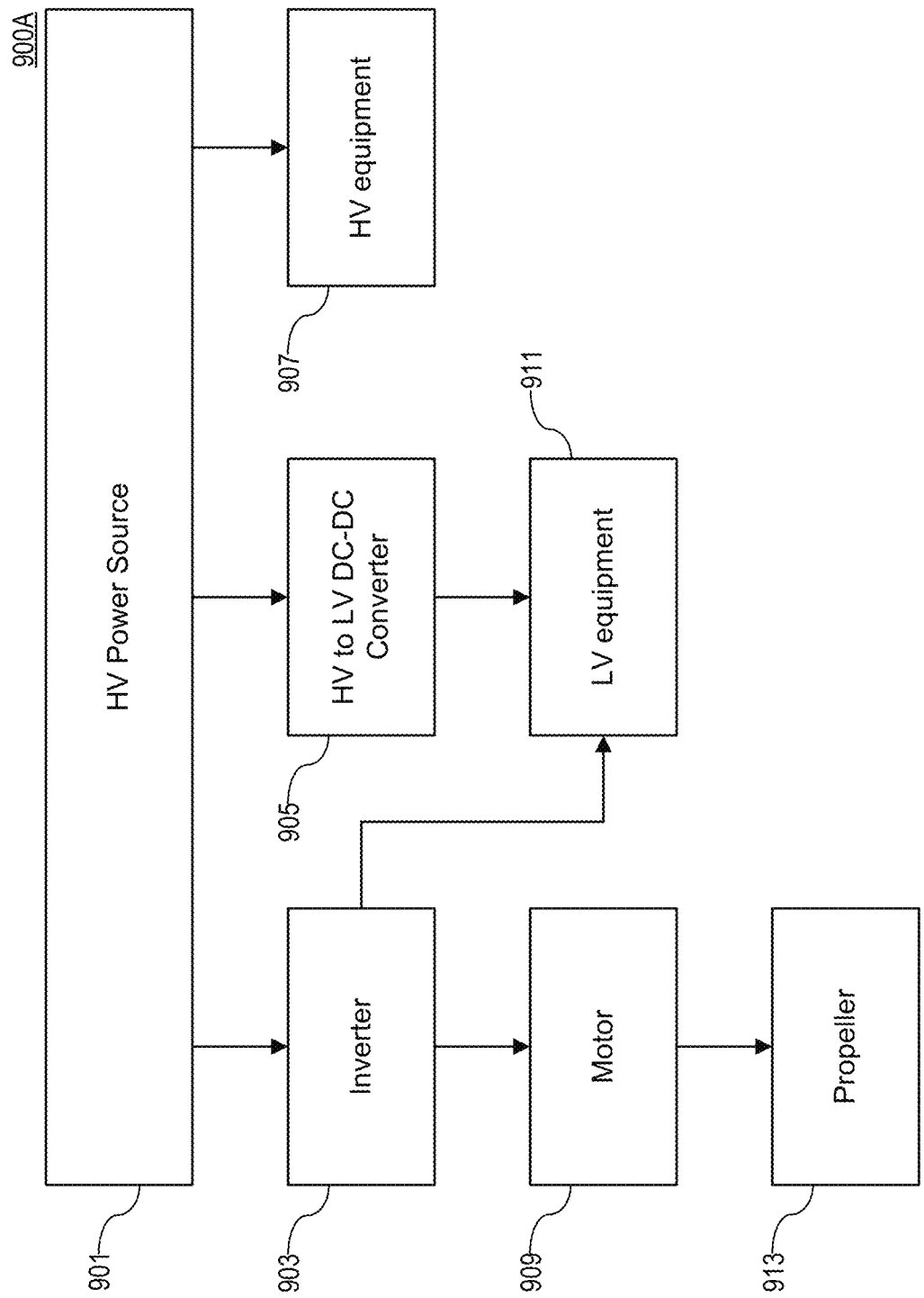
FIGS. 9A-9B illustrate exemplary systems, consistent with disclosed embodiments.
Figure 9B:
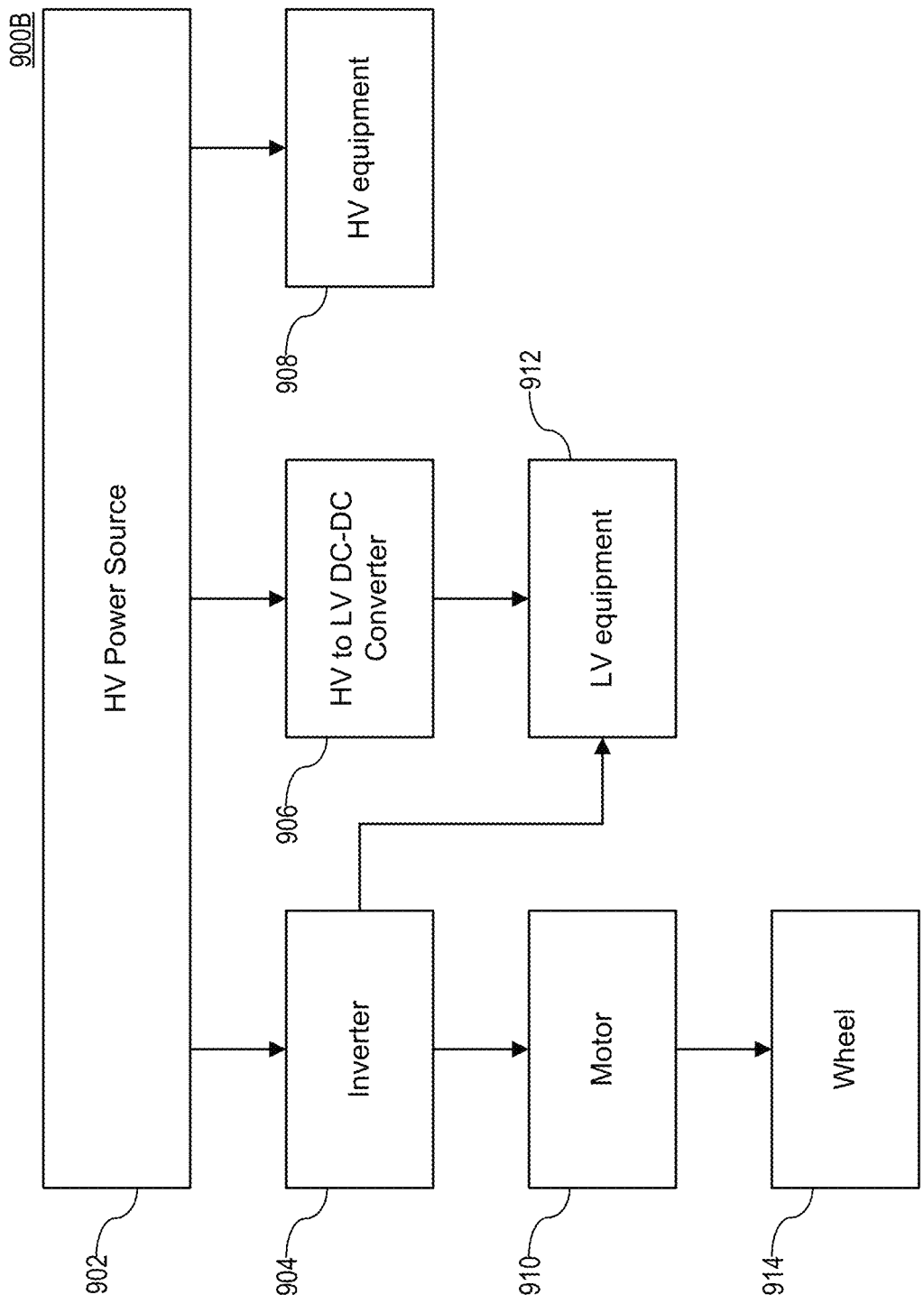

FIGS. 9A-9B illustrate exemplary systems, consistent with disclosed embodiments. For example and with reference to FIG. 9A, system 900A may be implemented in an aircraft (e.g., eVTOL aircraft) and may include HV power source 901, inverter 903, HV to LV DC-DC converter 905, other HV equipment 907, motor 909, other LV equipment 911, and propeller 913. In some embodiments, some of these components may be removed or duplicated. In the example of FIG. 9B, system 900B may be implemented in a car (e.g., electric or hybrid car) and may include HV power source 902, inverter 904, HV to LV DC-DC converter 906, other HV equipment 908, motor 910, other LV equipment 912, and wheel 914. In some embodiments, a balancing and measuring circuit may be implemented in any component of systems 900A, 900B that include or use HV power. For example, balancing and measuring circuit 800A and/or 800B may be implemented as part of HV power source 901, 902; inverter 903, 904; HV to LV DC-DC converter 905, 906; other HV equipment 907, 908; any combination of the foregoing; or any other component of systems 900A and/or 900B that uses high voltage power. Further, by way of non-limiting example, balancing and measuring circuit 800A and/or 800B may be implemented in an EMI filter with Class Y capacitors and/or in a high voltage power source (e.g., battery) of an electric vehicle (e.g., aircraft, car, etc.). Balancing and measuring circuit 800A and/or 800B may be placed between any power source and a load. For example, balancing and measuring circuit 800A and/or 800B may be part of (e.g., electrically coupled with), for example, a battery or battery enclosure.

The systems depicted in FIGS. 9A-9B are non-limiting examples of systems that use high voltage power that may benefit from implementing disclosed embodiments. Other systems (e.g., sea glider, motorcycle, ship, submarine, robotic machinery, etc.) may similarly use the disclosed embodiments.

Figure 10:
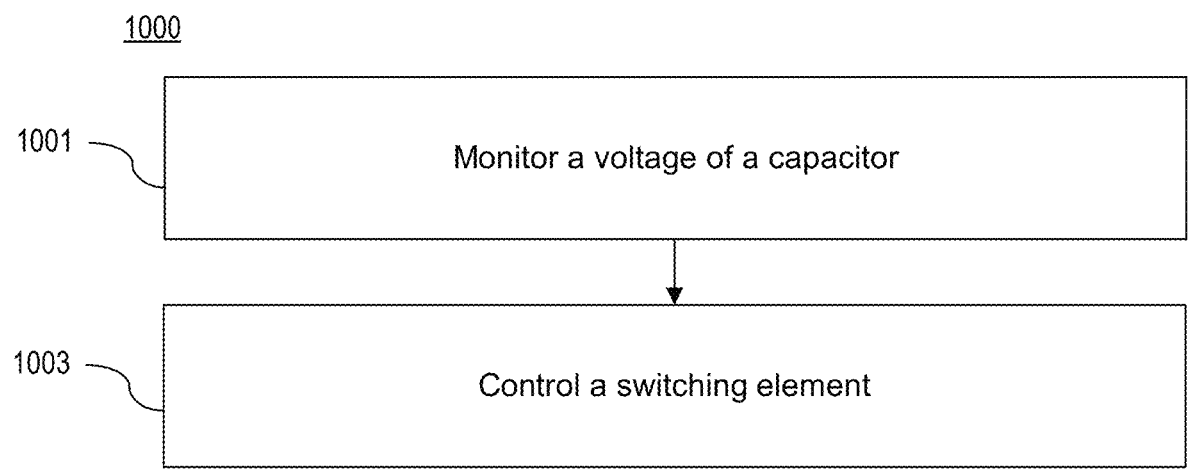
FIG. 10 illustrates an exemplary balancing method, consistent with disclosed embodiments.

FIG. 10 illustrates an exemplary balancing method 1000, consistent with disclosed embodiments. In general, it may be understood that any or all steps of the exemplary methods of FIG. 10 may be performed or executed by at least one processor (e.g., part of, or using, control circuit 801, first controller E1, and/or second controller E2), such as according to one or more instructions stored on a computer-readable medium (e.g., non-transitory computer-readable medium).

In step 1001, at least one processor (e.g., control circuit 801, first controller E1, and/or second controller E2) may monitor a voltage of a capacitor. For example, the at least one processor may monitor a voltage of a capacitor by using a voltage sensor (e.g., configured to measure a voltage at a switching element). Monitoring a voltage, or any measurable value, may include measuring the value, storing the value in memory, and/or executing operations based on (e.g., in response to and/or based on a value exceeding a threshold) the value. Additionally or alternatively, the at least one processor may monitor a current of a capacitor using a current sensor (e.g., configured to measure a current at a switching element). In some embodiments, the at least one processor may be configured to record a measured voltage and/or current at predetermined intervals (e.g., every 1 ms, 10 ms, etc.). In some embodiments, the at least one processor may be configured to save (e.g., store) in a memory (e.g., random access memory, non-volatile memory) a measured voltage and/or current. For example, the at least one processor may be configured to save a number (e.g., 5, 10, 100, all) of the most recently measured voltage and/or current values to memory.

In step 1003, at least one processor may control (e.g., close, open, turn on, or turn off) a switching element (e.g., based on a monitored voltage). For example and with reference to FIG. 8B, when using analog control and a first leakage impedance (R3) is lower than a second leakage impedance (R4), controller E2 may be configured to drive (e.g., linearly, exponentially, step-wise) a gate voltage of switching element M2 until (e.g., ceasing to drive the gate voltage or lowering the gate voltage below a gate threshold voltage of the switching element when it determines that) the combined impedance of resistive element R2, switching element M2, and second leakage R4 is equal to (e.g., is determined to be equal to within a predetermined tolerance threshold), the first leakage R3, i.e., provide an equal (e.g., equal to within a predetermined tolerance threshold) leakage current path on the opposite side (e.g., with each side being defined based on a common voltage point, such as the common voltage point between M1/R1/C3/R3 and M2/R2/C4/R4). The controller E2 may drive the gate voltage of switching element M2 using a closed-loop control process, in which the voltage across the first capacitor C3 is monitored (e.g., by measuring the voltage across switching element M2) and targeted to equal half of the system voltage, and the controller E2 adjusts the gate voltage of switching element M2 until (e.g., ceasing to drive the gate voltage or lowering the gate voltage below a gate threshold voltage of the switching element when it determines that) the voltage across first capacitor C3 equals (e.g., is determined to be equal to within a predetermined tolerance threshold) the target voltage (e.g., half of a reference voltage generated by voltage circuit V2). Further, when using analog control and a first leakage impedance (R3) is higher than a second leakage impedance (R4), controller E1 may be configured to drive (e.g., linearly, exponentially, step-wise) a gate voltage of switching element M1 until (e.g., ceasing to drive the gate voltage or lowering the gate voltage below a gate threshold voltage of the switching element when it determines that) the combined impedance of resistive element R1, switching element M1, and first leakage R3 is equal to (e.g., is determined to be equal to within a predetermined tolerance threshold) the second leakage R4. The controller E1 may drive the gate voltage of switching element M1 using a closed-loop control process, in which the voltage across the second capacitor C4 is monitored (e.g., by measuring the voltage across switching element M1) and targeted to equal half of the system voltage, and the controller E1 adjusts the gate voltage of switching element M1 until (e.g., ceasing to drive the gate voltage or lowering the gate voltage below a gate threshold voltage of the switching element when it determines that) the voltage across first capacitor C3 equals (e.g., is determined to be equal to within a predetermined tolerance threshold) the target voltage.

By way of another example and with reference to FIG. 8B, when using PWM control and a first leakage impedance (R3) is lower than a second leakage impedance (R4), controller E2 may be configured to drive the gate voltage (e.g., the duty ratio) of switching element M2 until (e.g., ceasing to drive the gate voltage or lowering the gate voltage below a gate threshold voltage of the switching element when it determines that) the combined impedance of resistive element R2, switching element M2, and second leakage R4 is equal to (e.g., is determined to be equal to within a predetermined tolerance threshold) the first leakage R3, i.e., provide an equal leakage current path on the opposite side (e.g., with each side being defined based on a common voltage point, such as the common voltage point between M1/R1/C3/R3 and M2/R2/C4/R4). The controller E2 may drive the gate voltage of switching element M2 using a closed-loop control process, in which the voltage across the first capacitor C3 is monitored (e.g., by measuring the voltage across switching element M2) and targeted to equal half of the system voltage, and the controller E2 adjusts the gate voltage of switching element M2 until (e.g., ceasing to drive the gate voltage or lowering the gate voltage below a gate threshold voltage of the switching element when it determines that) the voltage across first capacitor C3 equals (e.g., is determined to be equal to within a predetermined tolerance threshold) the target voltage (e.g., half of a reference voltage generated by voltage circuit V2). Further, when using PWM control and a second leakage impedance (R4) is lower than a first leakage impedance (R3), controller E1 may be configured to drive the gate voltage (e.g., the duty ratio) of switching element M1 until (e.g., ceasing to drive the gate voltage or lowering the gate voltage below a gate threshold voltage of the switching element when it determines that) the combined impedance of resistive element R1, switching element M1, and first leakage R3 is equal to (e.g., is determined to be equal to within a predetermined tolerance threshold) the second leakage R4. The controller E1 may drive the gate voltage of switching element M1 using a closed-loop control process, in which the voltage across the second capacitor C4 is monitored (e.g., by measuring the voltage across switching element M1) and targeted to equal half of the system voltage, and the controller E1 adjusts the gate voltage of switching element M1 until (e.g., ceasing to drive the gate voltage or lowering the gate voltage below a gate threshold voltage of the switching element when it determines that) the voltage across second capacitor C4 equals (e.g., is determined to be equal to within a predetermined tolerance threshold) the target voltage.

Controllers E1 and/or E2 may repeat steps 1001 and 1003 multiple times, such as continuously or at a predetermined interval, to actively maintain balanced voltages across first capacitor C3 and second capacitor C4, such as when using a closed-loop control process. For example, controllers E1 and/or E2 may perform balancing operations every 1 ms, 10 ms, 100 ms, or any other predetermined interval. The predetermined interval may be selected to reduce (e.g., minimize) energy or power consumption of balancing and measuring circuit 800B while maintaining a level of efficiency or expected operation.

Similarly and by way of non-limiting example with reference to FIG. 8A, control circuit 801 may use analog control, PWM control, or a combination thereof to drive (e.g., linearly, exponentially, step-wise) a gate voltage of switching element of second circuit 805 until (e.g., ceasing to drive the gate voltage or lowering the gate voltage below a gate threshold voltage of the switching element when it determines that) the combined impedance of the one or more resistive elements and switching elements of first circuit 803 and the associated leakage is equal to (e.g., is determined to be equal to within a predetermined tolerance threshold), a leakage associated with second circuit 805, i.e., provide an equal (e.g., equal to within a predetermined tolerance threshold) leakage current path on the opposite side (e.g., with each side being defined based on a common voltage point, such as the common voltage point between the first circuit/C1 and the second circuit/C2). Further, control circuit 801 may repeat steps 1001 and 1003 multiple times, such as continuously or at a predetermined interval, to actively maintain balanced voltages across first capacitor C1 and second capacitor C2, such as when using a closed-loop control process. For example, control circuit 801 may perform balancing operations every 1 ms, 10 ms, 100 ms, or any other predetermined interval. The predetermined interval may be selected to reduce (e.g., minimize) energy or power consumption of balancing and measuring circuit 800A while maintaining a level of efficiency or expected operation.

As part of or after step 1001 and/or step 1003, or as a separate subsequent step, the at least one processor may be configured to output a status to a central processor. For example, control circuit 801, controllers E1 and/or E2 may be configured to output a status to a central processor of the system (e.g., FCC in an aircraft) indicating if the balancing method is performing as expected (e.g., a working status indicator) or if the balancing method is not performing as expected (e.g., a failure status indicator). In response to receiving a failure status indicator, the central processor may output to a user of the system a warning (e.g., visual, auditory, haptic) informing the user that the balancing and measuring circuit has failed.

Figure 11:
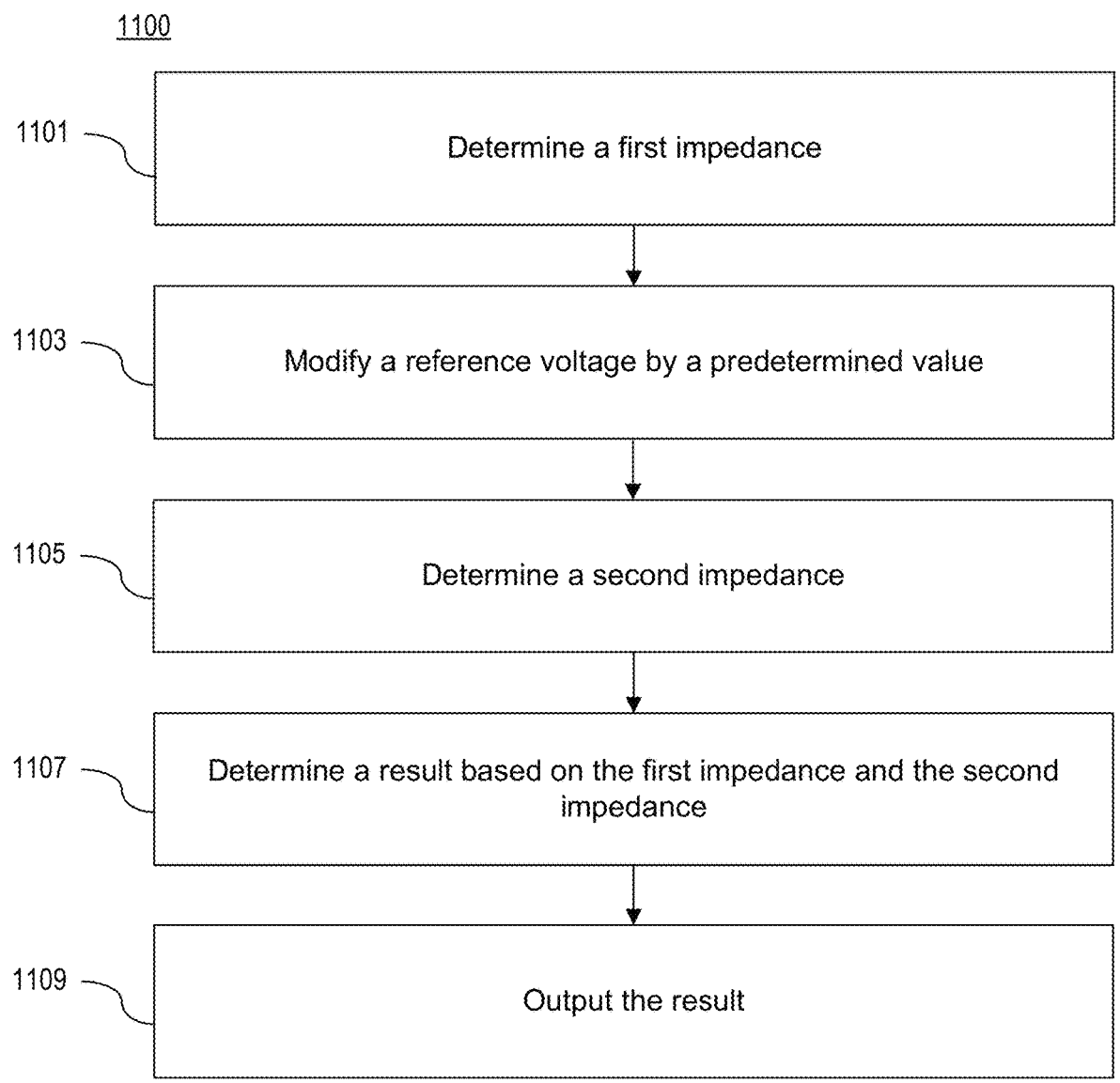
FIG. 11 illustrates an exemplary measuring method, consistent with disclosed embodiments.

FIG. 11 illustrates an exemplary measuring method 1100, consistent with disclosed embodiments. In general, it may be understood that any or all steps of the exemplary methods of FIG. 11 may be performed or executed by at least one processor (e.g., control circuit 801, first controller E1, second controller E2), such as according to one or more instructions stored on a computer-readable medium (e.g., non-transitory computer-readable medium). In some embodiments, the at least one processor may perform a measuring method at a predetermined interval. For example, the at least one processor may be configured to automatically initiate or perform measuring method 1100 every 30 seconds, minute, hour, or any other interval. In some embodiments, the at least one processor may be configured to only perform a measuring method in response to a command. For example, the at least one processor may only initiate or perform measuring method 1100 in response to a command from a central processor (e.g., FCC of an aircraft).

In step 1101, at least one processor (e.g., control circuit 801, first controller E1, second controller E2) may determine a first impedance (e.g., represented by a resistive value). The first impedance may be a balancing impedance. The balancing impedance may refer to the equivalent or combined impedance of a resistive element, a switching element, and leakage, and may be used to balance the voltages across the capacitors. For example, first controller E1 may determine a first balancing impedance equal to an effective resistance of resistive element R1, switching element M1, and second leakage R4. Additionally or alternatively, second controller E2 may determine a first balancing impedance equal to an effective resistance of resistive element R2, switching element M2, and first leakage R3. In some embodiments, the at least one processor may be configured to save (e.g., store) the first impedance in a memory.

In step 1103, at least one processor may modify a reference voltage by a predetermined amount. For example, controller E1 may modify a received reference voltage from voltage circuit V1 by a predetermined value, and controller E2 may modify a received reference voltage from voltage circuit V2 by a predetermined value. The predetermined value may be stored in a memory of the at least one processor and may be or include a multiplier or an offset value. In some embodiments, modifying the reference voltage may include adding the predetermined value to the reference voltage value or multiplying the reference voltage value by the predetermined value. Modifying the reference voltage may include introducing small, temporary leakage imbalances and voltage imbalances across first capacitor C3 and second capacitor C4. In some embodiments, the at least one processor may be configured to temporarily modify the reference voltage. For example, controllers E1 and/or E2 may modify the reference voltage and unbalance the voltages across capacitors C3 and C4 until step 1105 is completed. In some embodiments, at least one processor is configured to modify the reference voltage by a predetermined value at a predetermined interval (e.g., according to a stepwise function). For example, controllers E1 and/or E2 may be configured to modify the reference voltage by the predetermined value at a regular interval (e.g., every 30 seconds, every minute, every 15 minutes, etc.).

Similarly and by way of non-limiting example with reference to FIG. 8A, control circuit 801 may modify one or more received reference voltages from one or more voltage circuits by a predetermined value. For example, control circuit 801 may modify a reference voltage and unbalance the voltages across capacitors C1 and C2 until step 1105 is completed (e.g., until determining that step 1105 is completed).

In step 1105, at least one processor may measure a second value. For example, controller E1 may determine a second impedance. The second impedance may be a balancing impedance and may equal the combined impedance of a resistive element, a switching element, and leakage used to unbalance the voltages across the capacitors based on the modified reference voltage. For example, first controller E1 may determine a second unbalancing impedance equal to an effective resistance of resistive element R1, switching element M1, and second leakage R4. Additionally or alternatively, second controller E2 may determine a second unbalancing impedance equal to an effective resistance of resistive element R2, switching element M2, and first leakage R3. In some embodiments, the at least one processor may be configured to save (e.g., store) the second impedance in a memory. For example, controllers E1 and/or E2 may be configured to store the second unbalancing impedance value in a same memory area (e.g., database, data structure, vector) as the associated first balancing impedance value.

Similarly and by way of non-limiting example with reference to FIG. 8A, control circuit 801 may modify one or more received reference voltages from one or more voltage circuits by a predetermined value. For example, control circuit 801 may modify a reference voltage and unbalance the voltages across capacitors C1 and C2 until step 1105 is completed (e.g., until determining that step 1105 is completed).

In step 1107, at least one processor may determine a result based on the first impedance and the second impedance. For example, controllers E1 and/or E2 may be configured to determine an impedance of first leakage R3 and second leakage R4 based on the first balancing impedance, the reference voltage, the second unbalancing impedance, and the modified reference voltage. In some embodiments, the at least one processor may save the determined result in a memory. For example, controllers E1 and/or E2 may store a subset of (e.g., the 5, 10, 15 most recent), or all of, determined leakage impedances in a memory location (e.g., data structure, database).

Similarly and by way of non-limiting example with reference to FIG. 8A, control circuit 801 may modify one or more received reference voltages from one or more voltage circuits by a predetermined value. For example, control circuit 801 may be configured to determine an impedance of first leakage associated with capacitor C1 and second leakage associated with capacitor C2 based on the first balancing impedance, the reference voltage, the second unbalancing impedance, and the modified reference voltage.

In step 1109, at least one processor may output a result to at least one processor (e.g., a central processor). For example, controllers E1 and/or E2 may output the determined leakage impedance R3 and/or the determined leakage impedance R4 to at least one processor (e.g., FCC of an aircraft). The at least one processor may output the determined leakage impedances to a user of the system (e.g., display on a display device).

Similarly and by way of non-limiting example with reference to FIG. 8A, control circuit 801 may output the determined leakage impedance associated with capacitor C1 and/or the determined leakage impedance associated with capacitor C2 to at least one processor (e.g., FCC of an aircraft). The at least one processor may output the determined leakage impedances to a user of the system (e.g., display on a display device).

In some embodiments, the at least one processor may cause a change to a display device, such as by displaying an alert (e.g., flashing shapes and/or text, changing a color of a display element, changing a shape of a display element, overlaying a display element over another, displaying a not previously displayed element). For example, the at least one processor may display an alert when at least one determined leakage impedance exceed a predetermined threshold.

Additional aspects of the present disclosure may be further described via the following clauses:

1. A balancing and measuring circuit for a high voltage system, comprising:
   a first capacitor electrically connected between a first voltage and a chassis voltage, wherein the first voltage is greater than the chassis voltage;
   a second capacitor electrically connected between a second voltage and the chassis voltage, wherein the second voltage is less than the chassis voltage;
   a first circuit associated with the first capacitor; and
   a second circuit associated with the second capacitor,
   wherein the first circuit and the second circuit each comprise:
     a resistive element;
     a switching element;
     a voltage circuit configured to generate a reference voltage; and
     a controller configured to monitor a voltage of a reference capacitor and to control the switching element based on the monitored voltage, wherein the resistive element and the switching element are connected in series.

2. The circuit of clause 1, wherein each controller is configured to monitor the voltage and a current of the reference capacitor.

3. The circuit of clause 1 or 2, wherein each resistive element has a resistance greater than or equal to a minimum insulation resistance of the high voltage system.

4. The circuit of any one of clauses 1-3, wherein a first terminal of the first capacitor is coupled to the resistive element of the first circuit and a second terminal is coupled to the switching element of the first circuit.

5. The circuit of clause 4, wherein the first terminal is a positive terminal and the second terminal is a negative terminal.

6. The circuit of clause 4, wherein the first terminal is a negative terminal and the second terminal is a positive terminal.

7. The circuit of any one of clauses 1-6, wherein a third terminal of the second capacitor is coupled to the resistive element of the second circuit and a fourth terminal is coupled to the switching element of the second circuit.

8. The circuit of clause 7, wherein the third terminal is a positive terminal and the fourth terminal is a negative terminal.

9. The circuit of clause 7, wherein the third terminal is a negative terminal and the fourth terminal is a positive terminal.

10. The circuit of any one of clauses 1-9, wherein a resistance value of each resistive element is selected to reduce a shock voltage potential below a shock threshold.

11. The circuit of clause 10, wherein the resistance value is at least 200 kiloohms.

12. The circuit of clause 10 or 11, wherein the resistance value is at least 400 kiloohms.

13. The circuit of any one of clauses 1-12, wherein the voltage circuit includes one or more of:
   a voltage sensor;
   a voltage divider; and
   a voltage source.

14. The circuit of any one of clauses 1-13, wherein the reference voltage is equal to a half of a measured voltage.

15. The circuit of any one of clauses 1-14, wherein each controller is configured to control the corresponding switching element using analog control.

16. The circuit of any one of clauses 1-15, wherein each controller is configured to control the corresponding switching element using pulse width modulation (PWM) control.

17. The circuit of any one of clauses 1-16, wherein each controller includes one or more of:
   a compensator;
   a processor; and
   an operational amplifier.

18. The circuit of any one of clauses 1-17, wherein the controller includes a closed loop control process.

19. The circuit of any one of clauses 1-18, wherein the first circuit and the second circuit each further comprise a current-blocking element coupled between the resistive element and the switching element.

20. The circuit of any one of clauses 1-19, wherein the first circuit and the second circuit are configured to independently:
   determine a first impedance;
   modify the reference voltage by a predetermined value;
   determine a second impedance; and
   determine a result based on the first impedance and the second impedance.

21. The circuit of clause 20, wherein the first circuit and the second circuit are each configured to modify the reference voltage by the predetermined value at a respective predetermined interval.

22. The circuit of clause 20 or 21, wherein the result includes an impedance of a leakage of the circuit.

23. The circuit of any one of clauses 1-22, wherein the first circuit and the second circuit are configured to output a status to a central processor, wherein the status includes one or more of:
   a determined impedance;
   a working status indicator; and
   a failure status indicator.

24. The circuit of any one of clauses 1-23, wherein each controller is configured to switch between controlling the corresponding switching element using analog control and controlling the corresponding switching element using PWM control based on a received signal from a central processor.

25. A method for balancing and measuring a voltage in a circuit, comprising:
   receiving a reference voltage;
   controlling a switching element until a voltage of a capacitor is equal to the received reference voltage;
   determining a first impedance of the capacitor;
   modifying the received reference voltage by a predetermined value;
   controlling the switching element until the voltage of the capacitor is equal to the modified reference voltage;
   determining a second impedance of the capacitor;
   determining a result based on the first impedance and the second impedance; and
   outputting the result.

26. The method of clause 25, wherein controlling the switching element includes analog control.

27. The method of clause 25 or 26, wherein controlling the switching element includes pulse width modulation (PWM) control.

28. The method of any one of clauses 25-27, wherein controlling the switching element includes a closed loop control process.

29. The method of any one of clauses 25-28, wherein modifying the received reference voltage occurs at a respective predetermined interval.

30. The method of any one of clauses 25-29, wherein the result includes an impedance of a leakage of the circuit.

31. An aircraft comprising:
 a high voltage system;
 one or more flight control computers; and
 a balancing and measuring circuit, comprising:
  a first capacitor electrically connected between a first voltage and a chassis voltage, wherein the first voltage is greater than the chassis voltage;
  a second capacitor electrically connected between a second voltage and the chassis voltage, wherein the second voltage is less than the chassis voltage;
  a first circuit associated with the first capacitor; and
  a second circuit associated with the second capacitor, wherein the first circuit and the second circuit each comprise:
   a resistive element;
   a switching element;
   a voltage circuit configured to generate a reference voltage; and
   a controller configured to monitor a voltage of a reference capacitor and to control the switching element based on the monitored voltage,
  wherein the resistive element and the switching element are connected in series.

32. The aircraft of clause 31, wherein each controller is configured to monitor the voltage and a current of the reference capacitor.

33. The aircraft of clause 31 or 32, wherein each resistive element has a resistance greater than or equal to a minimum insulation resistance of the high voltage system.

34. The aircraft of any one of clauses 31-33, wherein a first terminal of the first capacitor is coupled to the resistive element of the first circuit and a second terminal is coupled to the switching element of the first circuit.

35. The aircraft of clause 34, wherein the first terminal is a positive terminal and the second terminal is a negative terminal.

36. The aircraft of clause 34, wherein the first terminal is a negative terminal and the second terminal is a positive terminal.

37. The aircraft of any one of clauses 31-36, wherein a third terminal of the second capacitor is coupled to the resistive element of the second circuit and a fourth terminal is coupled to the switching element of the second circuit.

38. The aircraft of clause 37, wherein the third terminal is a positive terminal and the fourth terminal is a negative terminal.

39. The aircraft of clause 37, wherein the third terminal is a negative terminal and the fourth terminal is a positive terminal.

40. The aircraft of any one of clauses 31-39, wherein a resistance value of each resistive element is selected to reduce a shock voltage potential below a shock threshold.

41. The aircraft of clause 40, wherein the resistance value is at least 200 kiloohms.

42. The aircraft of clause 40 or 41, wherein the resistance value is at least 400 kiloohms.

43. The aircraft of any one of clauses 31-42, wherein the voltage circuit includes one or more of:
 a voltage sensor;
 a voltage divider; and
 a voltage source.

44. The aircraft of any one of clauses 31-43, wherein the reference voltage is equal to a half of a measured voltage.

45. The aircraft of any one of clauses 31-44, wherein each controller is configured to control the corresponding switching element using analog control.

46. The aircraft of any one of clauses 31-45, wherein each controller is configured to control the corresponding switching element using pulse width modulation (PWM) control.

47. The aircraft of any one of clauses 31-46, wherein each controller includes one or more of:
 a compensator;
 a processor; and
 an operational amplifier.

48. The aircraft of any one of clauses 31-47, wherein the controller includes a closed loop control process.

49. The aircraft of any one of clauses 31-48, wherein the first circuit and the second circuit each further comprise a current-blocking element coupled between the resistive element and the switching element.

50. The aircraft of any one of clauses 31-49, wherein the first circuit and the second circuit are configured to independently:
 determine a first impedance;
 modify the reference voltage by a predetermined value;
 determine a second impedance; and
 determine a result based on the first impedance and the second impedance.

51. The aircraft of clause 50, wherein the first circuit and the second circuit are each configured to modify the reference voltage by the predetermined value at a respective predetermined interval.

52. The aircraft of clause 50 or 51, wherein the result includes an impedance of a leakage of the circuit 53. The aircraft of any one of clauses 31-52, wherein the first circuit and the second circuit are configured to output a status to the one or more flight control computers, wherein the status includes one or more of:
 a determined impedance;
 a working status indicator; and
 a failure status indicator.

54. The aircraft of any one of clauses 31-53, wherein each controller is configured to switch between controlling the corresponding switching element using analog control and controlling the corresponding switching element using PWM control based on a received signal from a central processor.

55. A non-transitory computer-readable medium storing instructions that, when executed by at least one processor, cause the at least one processor to perform operations comprising:
 controlling a switching element until a voltage of a capacitor is equal to a received reference voltage;
 determining a first impedance of the capacitor;
 modifying the received reference voltage by a predetermined value;
 controlling the switching element until the voltage of a capacitor is equal to the modified reference voltage;
 determining a second impedance of the capacitor;
 determining a result based on the first impedance and the second impedance; and
 outputting the result.

56. The non-transitory computer-readable medium of clause 55, wherein controlling the switching element includes analog control.

57. The non-transitory computer-readable medium of clause 55 or 56, wherein controlling the switching element includes pulse width modulation (PWM) control.

58. The non-transitory computer-readable medium of any one of clauses 55-57, wherein controlling the switching element includes a closed loop control process.

59. The non-transitory computer-readable medium of any one of clauses 55-58, wherein modifying the received reference voltage occurs at a respective predetermined interval.

60. The non-transitory computer-readable medium of any one of clauses 55-59, wherein the result includes an impedance of a leakage of a circuit.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the inventions disclosed herein.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. As used herein, unless specifically stated otherwise, being "based on" may include being dependent on, being interdependent with, being associated with, being defined at least in part by, being derived from, being influenced by, or being responsive to. As used herein, "related to" may include being inclusive of, being expressed by, being indicated by, or being based on. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent to those skilled in the art from consideration of the specification and practice of the implementations disclosed herein. It is intended that the architectures and circuit arrangements shown in figures are only for illustrative purposes and are not intended to be limited to the specific arrangements and circuit arrangements as described and shown in the figures. It is also intended that the specification and examples be considered as exemplary only, with the true scope and spirit of the invention being indicated by the following claims. The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the inventions disclosed herein. It is also intended that the sequence of steps shown in figures is only for illustrative purposes and is not intended to be limited to any particular sequence of steps. As such, those skilled in the art can appreciate that these steps can be performed in a different order while implementing the same method.

The invention claimed is:

1. A balancing and measuring circuit for a high voltage system, comprising:
   a first capacitor electrically connected between a first voltage and a chassis voltage, wherein the first voltage is greater than the chassis voltage;
   a second capacitor electrically connected between a second voltage and the chassis voltage, wherein the second voltage is less than the chassis voltage;
   a first circuit associated with the first capacitor; and
   a second circuit associated with the second capacitor,
   wherein the first circuit and the second circuit each comprise:
      a resistive element;
      a switching element;
      a voltage circuit configured to generate a reference voltage; and
      a controller configured to monitor a voltage of a reference capacitor and to control the switching element based on the monitored voltage,
      wherein the resistive element and the switching element are connected in series.

2. The circuit of claim 1, wherein each controller is configured to monitor the voltage and a current of the reference capacitor.

3. The circuit of claim 1, wherein each resistive element has a resistance greater than or equal to a minimum insulation resistance of the high voltage system.

4. The circuit of claim 1, wherein a first terminal of the first capacitor is coupled to the resistive element of the first circuit and a second terminal is coupled to the switching element of the first circuit.

5. The circuit of claim 4, wherein the first terminal is a positive terminal and the second terminal is a negative terminal.

6. The circuit of claim 4, wherein the first terminal is a negative terminal and the second terminal is a positive terminal.

7. The circuit of claim 1, wherein a third terminal of the second capacitor is coupled to the resistive element of the second circuit and a fourth terminal is coupled to the switching element of the second circuit.

8. The circuit of claim 7, wherein the third terminal is a positive terminal and the fourth terminal is a negative terminal.

9. The circuit of claim 7, wherein the third terminal is a negative terminal and the fourth terminal is a positive terminal.

10. The circuit of claim 1, wherein a resistance value of each resistive element is selected to reduce a shock voltage potential below a shock threshold.

11. The circuit of claim 10, wherein the resistance value is at least 200 kiloohms.

12. The circuit of claim 10, wherein the resistance value is at least 400 kiloohms.

13. The circuit of claim 1, wherein the voltage circuit includes one or more of:
   a voltage sensor;
   a voltage divider; and
   a voltage source.

14. The circuit of claim 1, wherein the reference voltage is equal to a half of a measured voltage.

15. The circuit of claim 1, wherein each controller is configured to control the corresponding switching element using analog control.

16. The circuit of claim 1, wherein each controller is configured to control the corresponding switching element using pulse width modulation (PWM) control.

17. The circuit of claim 1, wherein each controller includes one or more of:
a compensator;
a processor; and
an operational amplifier.

18. The circuit of claim 1, wherein the controller includes a closed loop control process.

19. The circuit of claim 1, wherein the first circuit and the second circuit each further comprise a current-blocking element coupled between the resistive element and the switching element.

20. The circuit of claim 1, wherein the first circuit and the second circuit are configured to independently:
determine a first impedance;
modify the reference voltage by a predetermined value;
determine a second impedance; and
determine a result based on the first impedance and the second impedance.

21. The circuit of claim 20, wherein the first circuit and the second circuit are each configured to modify the reference voltage by the predetermined value at a respective predetermined interval.

22. The circuit of claim 1, wherein the first circuit and the second circuit are configured to output a status to a central processor, wherein the status includes one or more of:
a determined impedance;
a working status indicator; and
a failure status indicator.

23. The circuit of claim 1, wherein each controller is configured to switch between controlling the corresponding switching element using analog control and controlling the corresponding switching element using PWM control based on a received signal from a central processor.

24. A method for balancing and measuring a voltage in a circuit, comprising:
receiving a reference voltage;
controlling a switching element until a voltage of a capacitor is equal to the received reference voltage;
determining a first impedance of the capacitor;
modifying the received reference voltage by a predetermined value;
controlling the switching element until the voltage of the capacitor is equal to the modified reference voltage;
determining a second impedance of the capacitor;
determining a result based on the first impedance and the second impedance; and
outputting the result.

25. The method of claim 24, wherein controlling the switching element includes analog control.

26. The method of claim 24, wherein controlling the switching element includes pulse width modulation (PWM) control.

27. The method of claim 24, wherein controlling the switching element includes a closed loop control process.

28. The method of claim 24, wherein modifying the received reference voltage occurs at a respective predetermined interval.

29. The method of claim 24, wherein the result includes an impedance of a leakage of the circuit.

30. An aircraft comprising:
a high voltage system;
one or more flight control computers; and
a balancing and measuring circuit, comprising:
a first capacitor electrically connected between a first voltage and a chassis voltage, wherein the first voltage is greater than the chassis voltage;
a second capacitor electrically connected between a second voltage and the chassis voltage, wherein the second voltage is less than the chassis voltage;
a first circuit associated with the first capacitor; and
a second circuit associated with the second capacitor, wherein the first circuit and the second circuit each comprise:
a resistive element;
a switching element;
a voltage circuit configured to generate a reference voltage; and
a controller configured to monitor a voltage of a reference capacitor and to control the switching element based on the monitored voltage,
wherein the resistive element and the switching element are connected in series.

* * * * *